US012631752B2

(12) United States Patent
Yoon et al.

(10) Patent No.: US 12,631,752 B2
(45) **Date of Patent: *May 19, 2026**

(54) IMAGE SENSING DEVICE AND PHOTOGRAPHING DEVICE INCLUDING THE SAME

(71) Applicant: SK hynix Inc., Icheon-si (KR)

(72) Inventors: Hyung June Yoon, Icheon-si (KR); Dong Jin Lee, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 66 days.

This patent is subject to a terminal disclaimer.

(21) Appl. No.: 18/400,516

(22) Filed: Dec. 29, 2023

(65) Prior Publication Data

US 2024/0134051 A1 Apr. 25, 2024
US 2024/0230908 A9 Jul. 11, 2024

Related U.S. Application Data

(63) Continuation of application No. 17/194,156, filed on Mar. 5, 2021, now Pat. No. 11,860,279.

(30) Foreign Application Priority Data

Jun. 4, 2020 (KR) ........................ 10-2020-0067574

(51) Int. Cl.
*G01S 17/89* (2020.01)
*G01S 7/484* (2006.01)
(Continued)

(52) U.S. Cl.
CPC .............. *G01S 17/89* (2013.01); *G01S 7/484* (2013.01); *G01S 7/486* (2013.01); *G01S 17/931* (2020.01); *H04N 25/78* (2023.01)

(58) Field of Classification Search
CPC ...... G01S 17/89; G01S 17/894; G01S 17/931; G01S 7/4816; G01S 7/484; G01S 7/486;
(Continued)

(56) References Cited

U.S. PATENT DOCUMENTS

| | | | |
|---|---|---|---|
| 10,935,658 | B2 | 3/2021 | Park et al. |
| 2008/0211946 | A1 | 9/2008 | Uchida |

(Continued)

FOREIGN PATENT DOCUMENTS

| | | | |
|---|---|---|---|
| CN | 105143921 | B | 10/2018 |
| CN | 110291414 | A | 9/2019 |

(Continued)

OTHER PUBLICATIONS

Office Action mailed Nov. 13, 2023 for Chinese Patent Application No. 202110195270.2 (11 pages).

(Continued)

*Primary Examiner* — Shahan Ur Rahaman
(74) *Attorney, Agent, or Firm* — Perkins Coie LLP

(57) ABSTRACT

An image sensing device and a photographing device including the same are disclosed. The image sensing device includes a pixel array configured to have a first pixel and a second pixel that are different from each other in terms of at least one of an effective measurement distance, temporal resolution, spatial resolution, and unit power consumption, and a timing controller configured to determine whether a distance to a target object is equal to or less than a predetermined threshold distance, and selectively activate any one of the first pixel and the second pixel according to the result of determination.

19 Claims, 13 Drawing Sheets

(51) Int. Cl.

| | |
|---|---|
| ***G01S 7/486*** | (2020.01) |
| ***G01S 17/931*** | (2020.01) |
| ***H04N 25/78*** | (2023.01) |

(58) Field of Classification Search

CPC ................ G01S 7/4863; G01S 7/4865; H04N 5/36965; H04N 5/37455

See application file for complete search history.

(56) References Cited

U.S. PATENT DOCUMENTS

| | | | |
|---|---|---|---|
| 2013/0123015 A1 | 5/2013 | Jung et al. | |
| 2014/0198183 A1 | 7/2014 | Kim et al. | |
| 2016/0182886 A1 | 6/2016 | Lin et al. | |
| 2016/0356718 A1 | 12/2016 | Yoon et al. | |
| 2017/0031009 A1* | 2/2017 | Davidovic | G01S 7/4865 |
| 2017/0097417 A1 | 4/2017 | Wang | |
| 2019/0086540 A1* | 3/2019 | Park | G01S 7/4863 |
| 2019/0181133 A1 | 6/2019 | Hiblot et al. | |
| 2019/0230304 A1* | 7/2019 | Moore | G01S 17/10 |
| 2019/0310351 A1* | 10/2019 | Hughes | G02B 26/101 |
| 2020/0264311 A1* | 8/2020 | Le Dortz | G01S 17/36 |
| 2020/0314347 A1 | 10/2020 | Kageyama et al. | |
| 2021/0341616 A1 | 11/2021 | Saito | |
| 2023/0146183 A1* | 5/2023 | Mahara | G01S 17/894 356/5.01 |

FOREIGN PATENT DOCUMENTS

| | | | |
|---|---|---|---|
| CN | 110308451 | A | 10/2019 |
| CN | 110944128 | A | 3/2020 |
| KR | 20140051572 | A | 5/2014 |
| KR | 20180125882 | A | 11/2018 |
| KR | 20190032789 | A | 3/2019 |
| KR | 20190071998 | A | 6/2019 |
| KR | 20190094341 | A | 8/2019 |
| WO | 2019081301 | A1 | 5/2019 |

OTHER PUBLICATIONS

Notification to Grant Patent Right for Invention for CN Appl. No. 202110195270.2, mailed on Sep. 27, 2024, 6 pages with English translation.

Kong, X. et al., "SPAD Sensors with 256×2 Linear Array for Time Delay Integration Demonstration," School of Electronic Science and Engineering, Nanjing University, Nanjing, China, 4 pages.

Request for the Submission of an Opinion for KR Appl. No. 10-2020-0067574, mailed on Jul. 21, 2025, 18 pages with English translation.

* cited by examiner

IMAGE SENSING DEVICE AND PHOTOGRAPHING DEVICE INCLUDING THE SAME

CROSS-REFERENCE TO RELATED APPLICATIONS

This patent document is a continuation of and claims the benefits of priority to U.S. patent application Ser. No. 17/194,156, filed on Mar. 5, 2024, which further claims the priority and benefits of Korean patent application No. 10-2020-0067574, filed on Jun. 4, 2020, the disclosure of which is incorporated by reference in its entirety as part of the disclosure of this patent document.

TECHNICAL FIELD

The technology and implementations disclosed in this patent document generally relate to an image sensing device for sensing a distance to a target object using a Time of Flight (TOF) method, and a photographing device including the same.

BACKGROUND

An image sensor is a semiconductor device for capturing optical images by converting light that is incident thereon into electrical signals using a semiconductor material that reacts to light. With the recent development of computer industries and communication industries, demand for high-performance image sensors has been rapidly increasing in various electronic devices, for example, smartphones, digital cameras, video game consoles, devices for use with the Internet of Things (IoT), robots, surveillance cameras, medical micro-cameras, etc.

Image sensors may be broadly classified into CCD (Charge Coupled Device) image sensors and CMOS (Complementary Metal Oxide Semiconductor) image sensors. CCD image sensors may have less noise and better image quality than CMOS image sensors. However, CMOS image sensors have a simpler and more convenient driving scheme, and thus may be preferred in some applications. In addition, CMOS image sensors may allow a signal processing circuit to be integrated into a single chip, which makes it easy to miniaturize CMOS image sensors for implementation in a product, with the added benefit of consuming very low power. CMOS image sensors can be fabricated using a CMOS fabrication technology, which results in low manufacturing costs. CMOS image sensors have been widely used due to their suitability for implementation in a mobile device.

SUMMARY

Various embodiments of the disclosed technology relate to an image sensing device for sensing a distance to a target object by changing an operation mode, and a photographing device including the same.

In one aspect, an image sensing device is provided to include a pixel array configured to include at least one first pixel and at least one second pixel; and a timing controller configured to activate either the first pixel or the second pixel based on a distance between a target object and the pixel array, wherein the first pixel and the second pixel have different characteristics that include at least one of an effective measurement distance related to an ability to effectively sense a distance, a temporal resolution related to an ability to discern a temporal difference, a spatial resolution related to an ability to discern a spatial difference, or unit power consumption indicating an amount of power required to generate a pixel signal.

In another aspect, an image sensing device is provided to include a pixel array configured to include at least one first pixel configured to measure a distance to a target object using time for light emitted from the target object to arrive at the pixel array and at least one second pixel configured to measure the distance to the target object using a phase of light reflected from the target object; and a timing controller configured to activate either the first pixel or the second pixel based on a distance between the target object and the pixel array.

In another aspect, a photographing device is provided to include an image sensing device configured to include a first pixel and a second pixel that are different from each other in terms of at least one of an effective measurement distance, temporal resolution, spatial resolution, and unit power consumption, and an image signal processor configured to determine whether a distance to a target object is equal to or less than a predetermined threshold distance, and determine an operation mode of the image sensing device to be an object monitoring mode in which the first pixel is activated or a depth resolving mode in which the second pixel is activated.

In another aspect, a photographing device is provided to an image sensing device configured to have a first pixel and a second pixel different from the first pixel in having different values of at least one of an effective measurement distance, temporal resolution related to an ability to discern a temporal difference, spatial resolution related to an ability to discern a spatial difference, or unit power consumption indicating an amount of power required to generate a pixel signal; and an image signal processor configured to operate the image sensing device in an object monitoring mode in which the first pixel is activated or a depth resolving mode in which the second pixel is activated based on a comparison between a predetermined threshold distance and a distance between the pixel array and the target object.

In another aspect, a sensing device capable of detecting a distance to an object is provided to comprise: one or more first sensing pixels configured to detect light and measure a distance to a target object based on a first distance measuring technique; a first pixel driver coupled to and operable to control the one or more first sensing pixels in detecting light for measuring the distance; one or more second sensing pixels configured to detect light and measure a distance to a target object based on a second distance measuring technique that is different from the first distance measuring technique so that the first and second distance measuring techniques have different distance measuring characteristics; a second pixel driver coupled to and operable to control the one or more second sensing pixels in detecting light for measuring the distance; and a controller configured to activate either the one or more first sensing pixels or the one or more second sensing pixels based on the different distance measuring characteristics of the first and second sensing pixels with respect to a distance between the target object and the sensing device.

It is to be understood that both the foregoing general description and the following detailed description of the disclosed technology are illustrative and explanatory and are intended to provide further explanation of the disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

This patent document provides implementations and examples of an image sensing device and a photographing device including the image sensing device. Some implementations of the disclosed technology relate to sensing a distance to a target object by changing an operation mode. The disclosed technology provides various implementations of an image sensing device which can select an optimum Time of Flight (TOF) method based on a distance to a target object, and can thus sense the distance to the target object using the optimum TOF method.

Reference will now be made in detail to the embodiments of the disclosed technology, examples of which are illustrated in the accompanying drawings. Wherever possible, the same reference numbers will be used throughout the drawings to refer to the same or like parts.

Figure 1:
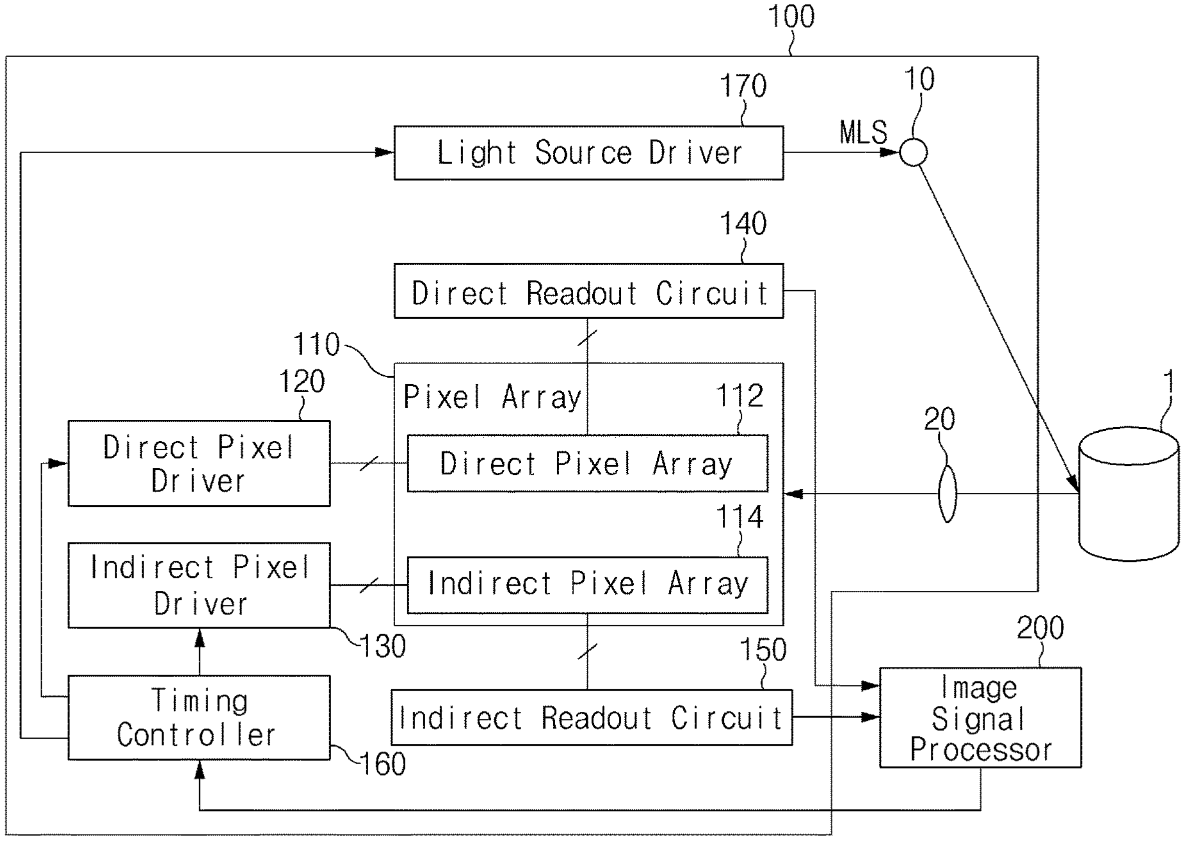
FIG. 1 is a block diagram illustrating an example of a photographing device based on some implementations of the disclosed technology.

FIG. 1 is a block diagram illustrating an example of a photographing device based on some implementations of the disclosed technology.

Referring to FIG. 1, the photographing device may refer to a device, for example, a digital still camera for capturing still images or a digital video camera for capturing moving images. For example, the photographing device may be implemented as a Digital Single Lens Reflex (DSLR) camera, a mirrorless camera, or a mobile phone (especially, a smartphone), and others. The photographing device may include a device having both a lens and an image pickup element such that the device can capture (or photograph) a target object and can thus create an image of the target object.

The photographing device may include an image sensing device 100 and an image signal processor 200.

The image sensing device 100 may measure the distance to a target object using a Time of Flight (TOF) method to measure the time for the light to travel between the image sensing device 100 and the target object. The image sensing device 100 may include a light source 10, a lens module 20, a pixel array 110, a first pixel driver labeled as "direct pixel driver 120," a second pixel driver labeled as "indirect pixel driver 130," a direct readout circuit 140, an indirect readout circuit 150, a timing controller 160, and a light source driver 170.

The light source 10 may emit light to a target object 1 upon receiving a clock signal carried by a modulated light signal (MLS) from the light source driver 170. The light source 10 may be a laser diode (LD) or a light emitting diode (LED) for emitting light (e.g., near infrared (NIR) light, infrared (IR) light or visible light) having a specific wavelength band, or may be any one of a Near Infrared Laser (NIR), a point light source, a monochromatic light source combined with a white lamp or a monochromator, and a combination of other laser sources. For example, the light source 10 may emit infrared light having a wavelength of 800 nm to 1000 nm. Although FIG. 1 shows only one light source 10 for convenience of description, other implementations are also possible, and a plurality of light sources may also be arranged in the vicinity of the lens module 20.

The lens module 20 may collect light reflected from the target object 1, and may allow the collected light to be focused onto pixels of the pixel array 110. For example, the lens module 20 may include a focusing lens having a surface formed of glass or plastic or another cylindrical optical element having a surface formed of glass or plastic. The lens module 20 may include a single lens group of one or more lenses.

The pixel array 110 may include a plurality of pixels (PXs) consecutively arranged in a two-dimensional (2D) matrix structure for capturing and detecting incident light for measuring distances. The pixels are arranged in a column direction and a row direction perpendicular to the column direction. Each pixel (PX) may convert incident light received through the lens module 20 into an electrical signal corresponding to the amount of incident light, and may thus output a pixel signal using the electrical signal. In implementations, the device can be configured so that the pixel signal may not indicate the color of the target object 1, and may be a signal indicating the distance to the target object 1.

The pixel array 110 may include, in addition to the imaging pixels, a first pixel array 112, "direct pixel array," which includes sensing pixels called "direct pixels" which are capable of sensing the distance to the target object 1 using a first technique for measuring the TOF such as a direct TOF method as further explained below, and a second pixel array 114, "indirect pixel array," which includes sensing pixels called "indirect pixels" which are capable of sensing the distance to the target object 1 using a second technique for measuring the TOF different from the first technique, such as an indirect TOF method as further explained below. The two pixel arrays 112 and 114 performing the TOF measurement for determining the distance may have different TOF characteristics, e.g., the first TOF technique may have a longer effective measurement distance and a lower spatial resolution, and the second TOF technique may have a higher spatial resolution and a shorter effective measurement distance. The inclusion of two or more such different TOF sensing pixels enable the device to detect objects located both near and far from the image sensing device while allowing such different TOF sensing pixels to complement one another and to collectively provide the ability of sensing objects at varying distances. In operation, a control circuit is provided to select one of the two pixel arrays 112 and 114 to measure a distance to a target object based on the different distance measuring characteristics of the two pixel arrays 112 and 114 to optimize the performance of distance measurements.

Figure 10:
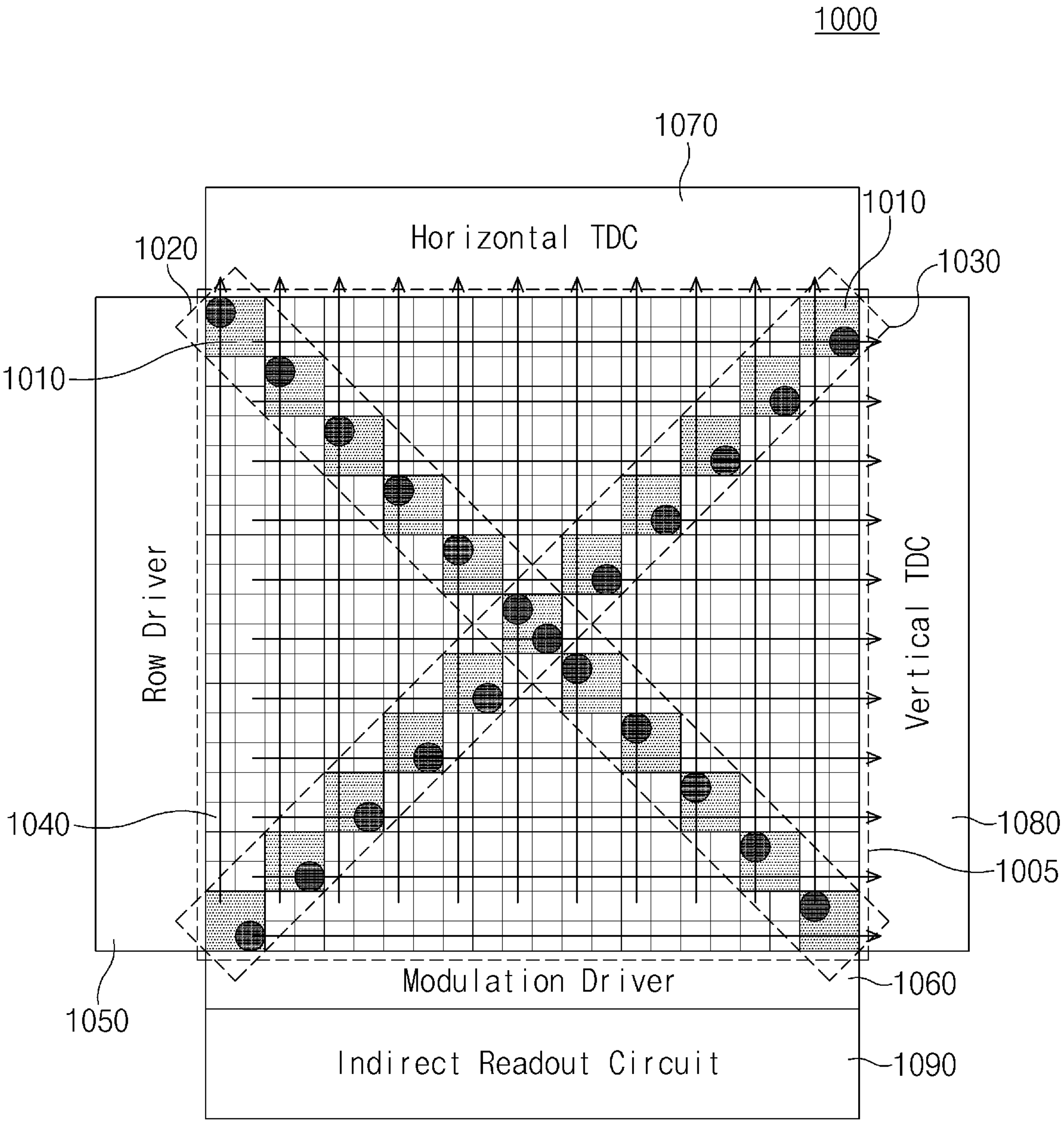
FIG. 10 is a schematic diagram illustrating an example of some constituent elements included in the image sensing device shown in FIG. 1 based on some implementations of the disclosed technology.

Referring to FIGS. 1 and 10, the direct pixels 1010 may be arranged in a line sensor shape within the pixel array 1005, such that the entire region including the direct pixels 1010 arranged in the line sensor shape may be smaller in size than the region including the indirect pixels 1040. This is because the direct pixels 1010 are designed to have a relatively longer effective measurement distance and a relatively higher temporal resolution rather than a purpose of acquiring an accurate depth image. As a result, the direct pixels 1010 can recognize the presence or absence of the target object 1 in the object monitoring mode using the relatively longer effective measurement distance and the relatively higher temporal resolution, and at the same time can correctly measure the distance to the target object 1 using the relatively longer effective measurement distance and the relatively higher temporal resolution.

As an example of the first technique for measuring TOF, the direct TOF method may directly measure a round trip time from a first time where pulse light is emitted to the target object 1 to a second time where pulse light reflected from the target object 1 is incident, and may thus calculate the distance to the target object 1 by using the round trip time and the speed of light. As an example of the second technique for measuring TOF, the indirect TOF method may emit light modulated by a predetermined frequency to the target object 1, may sense modulated light that is reflected from the target object 1, may calculate a phase difference between a clock signal MLS controlling the modulated light and a pixel signal generated from detecting the modulated light reflected back from the target object 1, and may thus calculate the distance to the target object 1 based on the phase difference between the clock signal MLS and the pixel signal. Generally, whereas the direct TOF method may have advantages in that it has a relatively higher temporal resolution and a longer effective measurement distance, the direct TOF method may have disadvantages in that it has a relatively lower spatial resolution due to a one-to-one correspondence structure between each pixel and each readout circuit.

The spatial resolution may be used to refer to the ability to discern a spatial difference. As each pixel is reduced in size, the spatial resolution may increase. Temporal resolution may be used to refer to the ability to discern a temporal difference. As time required by the pixel array 110 for outputting a pixel signal corresponding to a single frame is shortened, the temporal resolution may increase.

A time needed by each sensing pixel for measuring the TOF using the first or the second TOF measurement technique is referred to a unit sensing time. The power used during the unit sensing time by each sensing pixel for measuring the TOF is referred to as a unit power consumption. In some implementations in which the sensing pixel for measuring the TOF using the first technique is configured to receive a relatively high reverse bias voltage as will be described later, such sensing pixel may have a relatively higher unit power consumption than that of the sensing pixel measuring the TOF using the second technique.

In some implementations, the direct pixel may be a single-photon avalanche diode (SPAD) pixel. The operation principles of the SPAD pixel are as follows. A reverse bias voltage may be applied to the SPAD pixel to increase an electric field, resulting in formation of a strong electric field. Subsequently, there may occur impact ionization in which electrons generated by photons that are incident by the strong electric field move from one place to another place to generate electron-hole pairs. Specifically, in the SPAD pixel configured to operate in a Geiger mode in which a reverse bias voltage higher than a breakdown voltage is received, carriers (electrons or holes) generated by incident light may collide with electrons and holes generated by the above impact ionization, such that a large number of carriers may be generated by such collision. Accordingly, although a single photon is incident upon the SPAD pixel, avalanche breakdown may be triggered by the single photon, resulting in formation of a measurable current pulse. A detailed structure and operations of the SPAD pixel will be described later with reference to FIG. 4.

In some implementations, the indirect pixel may be a circulation pixel. In the circulation pixel, a first operation of moving, in a predetermined direction (e.g., a clockwise or counterclockwise direction), of photocharges generated by a photoelectric conversion element in response to reflected light and a second operation of transferring of photocharges collected by such movement to a plurality of floating diffusion (FD) regions can be performed separately from each other. For example, each circulation pixel may include a plurality of circulation gates and a plurality of transfer gates that surround the photoelectric conversion element. Potential of circulation gates and potential of transfer gates may be changed while being circulated in a predetermined direction. Photocharges generated by the photoelectric conversion element may move and transfer in a predetermined direction by a change in circulation potential between the circulation gates and the transfer gates. As described above, movement of photocharges and transfer of photocharges may be performed separately from each other, such that a time delay based on the distance to the target object 1 can be more effectively detected. A detailed structure and operations of the circulation pixel will be described later with reference to FIGS. 5 to 8. In addition, photocharges mentioned in the disclosed technology may be photoelectrons.

The direct pixel driver 120 may drive the direct pixel array 112 of the pixel array 110 in response to a control signal from the timing controller 160. For example, the direct pixel driver 120 may generate a quenching control signal to control a quenching operation for reducing a reverse bias voltage applied to the SPAD pixel to a breakdown voltage or less. In addition, the direct pixel driver 120 may generate a recharging control signal for implanting charges into a sensing node connected to the SPAD pixel.

The indirect pixel driver 130 may drive the indirect pixel array 114 of the pixel array 110 in response to a control signal from the timing controller 160. For example, the indirect pixel driver 130 may generate a circulation control signal, a transfer control signal, a reset control signal, and a selection control signal. In more detail, the circulation control signal may control movement of photocharges within a photoelectric conversion element of each pixel. The transfer control signal may allow moved photocharges to be sequentially transferred to the floating diffusion (FD) regions. The reset control signal may initialize each pixel. The selection control signal may control output of an electrical signal corresponding to a voltage of the floating diffusion (FD) regions.

The direct readout circuit 140 may be disposed at one side of the pixel array 110, may calculate a time delay between a pulse signal generated from each pixel of the direct pixel array 112 and a reference pulse, and may generate and store digital data corresponding to the time delay. The direct readout circuit 140 may include a time-to-digital circuit (TDC) configured to perform the above-mentioned operation. The direct readout circuit 140 may transmit the stored digital data to the image signal processor 200 under control of the timing controller 160.

The indirect readout circuit 150 may process an analog pixel signal generated from each pixel of the indirect pixel array 114, and may thus generate and store digital data corresponding to the pixel signal. For example, the indirect readout circuit 150 may include a correlated double sampler (CDS) circuit for performing correlated double sampling on the pixel signal, an analog-to-digital converter (ADC) circuit for converting an output signal of the CDS circuit into digital data, and an output buffer for temporarily storing the digital data. The indirect readout circuit 150 may transmit the stored digital data to the image signal processor 200 under control of the timing controller 160.

The timing controller 160 may control overall operation of the image sensing device 100. Thus, the timing controller 160 may generate a timing signal to control operations of the direct pixel driver 120, the indirect pixel driver 130, and the light source driver 170. In addition, the timing controller 160 may control activation or deactivation of each of the direct readout circuit 140 and the indirect readout circuit 150, and may control digital data stored in the direct readout circuit 140 and digital data stored in the indirect readout circuit 150 to be simultaneously or sequentially transmitted to the image signal processor 200.

Specifically, the timing controller 160 may selectively activate or deactivate the direct pixel array 112, the direct pixel driver 120, and the direct readout circuit 140 under control of the image signal processor 200, or may selectively activate or deactivate the indirect pixel array 114, the indirect pixel driver 130, and the indirect readout circuit 150 under control of the image signal processor 200. Operations for each mode of the image sensing device 100 will be described later with reference to FIGS. 2 and 3.

The light source driver 170 may generate a clock signal carried by a modulated light signal (MLS) capable of driving the light source 10 in response to a control signal from the timing controller 160.

The image signal processor 200 may process digital data received from the image sensing device 100, and may generate a depth image indicating the distance to the target object 1. Specifically, the image signal processor 200 may calculate the distance to the target object 1 for each pixel in response to a time delay denoted by digital data received from the direct readout circuit 140. In addition, the image signal processor 200 may calculate the distance to the target object 1 for each pixel in response to a phase difference denoted by digital data received from the indirect readout circuit 150.

The image signal processor 200 may control operations of the image sensing device 100. Specifically, the image signal processor 200 may analyze (or resolve) digital data received from the image sensing device 100, may decide a mode of the image sensing device 100 based on the analyzed result, and may control the image sensing device 100 to operate in the decided mode.

The image signal processor 200 may perform image signal processing of the depth image such that the image signal processor 200 may perform noise cancellation and image quality improvement of the depth image. The depth image generated from the image signal processor 200 may be stored in an internal memory of a photographing device, or a device including the photographing device or in an external memory either in response to a user request or in an automatic manner, such that the stored depth image can be displayed through a display. Alternatively, the depth image generated from the image signal processor 200 may be used to control operations of the photographing device or the device including the photographing device.

Figure 2:
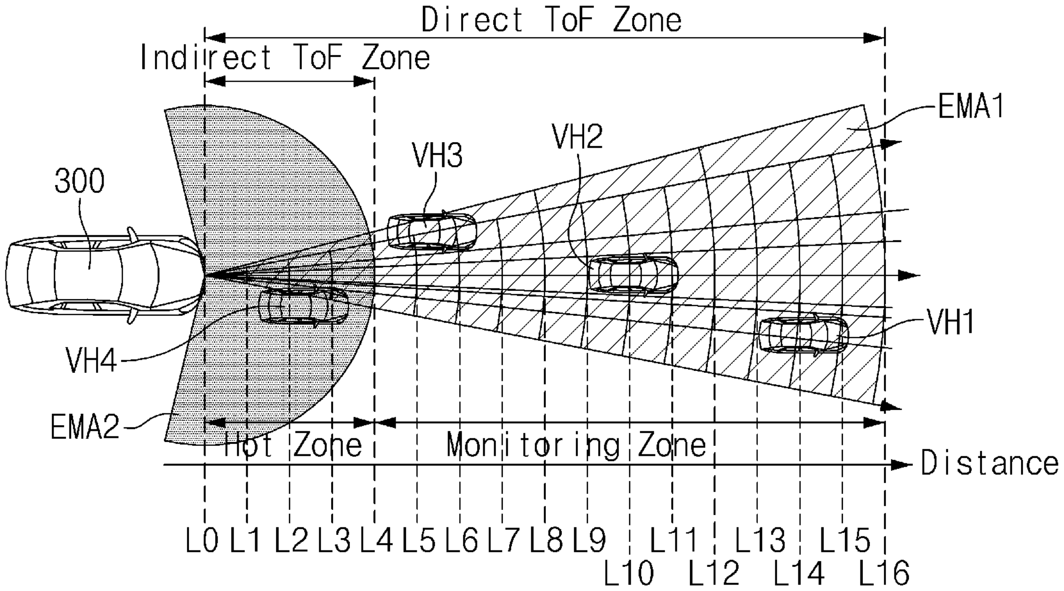
FIG. 2 is a conceptual diagram illustrating an example of operations for each mode of the image sensing device shown in FIG. 1 based on some implementations of the disclosed technology.

FIG. 2 is a diagram illustrating an example of operations for each mode of the image sensing device 100 shown in FIG. 1 based on some implementations of the disclosed technology.

Referring to FIG. 2, the photographing device may be embedded in various kinds of devices, for example, a mobile device such as a smartphone, a transportation device such as a vehicle, a surveillance device such as a closed circuit television (CCTV), and the others. For convenience of description and better understanding of the disclosed technology, it is assumed that the photographing device shown in FIG. 1 is embedded in a vehicle 300. The vehicle 300 including the photographing device will hereinafter be referred to as a host vehicle for convenience of description.

The image sensing device 100 embedded in the host vehicle 300 may sense the distance to the target object 1 using the direct pixel array 112 according to the direct TOF method, or may sense the distance to the target object 1 using the indirect pixel array 114 according to the indirect TOF method. As previously stated above, the direct TOF method may have a longer effective measurement distance and a lower spatial resolution, and the indirect TOF method may have a higher spatial resolution and a shorter effective measurement distance. Therefore, a first range within which the direct pixel array 112 can effectively measure the distance to the target object 1 (for example, at a valid reliability level corresponding to a predetermined reliability or greater) will hereinafter be denoted by a first effective measurement region (EMA1), and a second range within which the indirect pixel array 114 can effectively measure the distance to the target object 1 (for example, at a valid reliability level corresponding to a predetermined reliability or greater) will hereinafter be denoted by a second effective measurement region (EMA2).

In this case, the effective measurement distance may refer to a maximum length in which the direct pixel array 112 or the indirect pixel array 114 can effectively sense the distance to the target object 1 at a certain reliability level that is equal to or greater than a predetermined reliability threshold. Here, the effective measurement distance of the direct pixel may be longer than that of the indirect pixel.

As can be seen from FIG. 2, a Field of View (FOV) of the first effective measurement region EMA1 may be less than that of the second effective measurement region EMA2.

Operations of the image sensing device 100 based on the direct TOF method are as follows. In accordance with the direct TOF method, each pixel generates a pulse signal when incident light is sensed and as soon as the pulse signal is generated, the readout circuit generates digital data indicative of time of flight (TOF) by converting generation time of the pulse signal into digital data indicating a time of flight (TOF), and then stores the digital data. Each pixel is configured to generate a pulse signal by sensing incident light without the capability to store information, and thus the readout circuit is needed to store information needed for distance calculation. As a result, a readout circuit is needed for each pixel. For example, the readout circuit may be included in each pixel. However, if the array is configured with the plurality of pixels, each including the readout circuit, each pixel may have unavoidable increase in size due to the readout circuit. In addition, since an overall size for a region allocated to the array is restricted, it may be difficult to increase the number of pixels to be included in the array. Therefore, in some implementations of the disclosed technology, the readout circuit may be located outside the pixel array such that as many circuits as possible can be included in the pixel array. In some implementations, the array including direct pixels may be formed in an X-shape or a cross-shape such that the readout circuit and the direct pixel may be arranged to correspond to each other on a one to one basis. The above-mentioned operation method may be referred to as a line scanning method. When the readout circuit is located outside the pixel array, even if direct pixels are included in the same row or same column of the pixel array, the direct pixels are not simultaneously activated and only one of the direct pixels on the same row or the same column can be activated.

Operations of the image sensing device 100 based on the indirect TOF method are as follows. In accordance with the indirect TOF method, each pixel may accumulate photocharges corresponding to the intensity of incident light, and the readout circuit may convert a pixel signal corresponding to the photocharges accumulated in each pixel into digital data and then store the digital data. Each pixel can store information needed for distance calculation using photocharges without the readout circuit. As a result, pixels can share the readout circuit, and indirect pixels contained in the array including the indirect pixels can be simultaneously driven. The above-mentioned operation method may be referred to as an area scanning method.

Therefore, the number of pixels that are simultaneously driven when using the line scanning method is relatively smaller than that when using the area scanning method. Thus, a field of view (FOV) of the first effective measurement region EMA1 of the array including direct pixels driven by the line scanning method may be less than an FOV of the second effective measurement region EMA2 of the array including indirect pixels driven by the area scanning method.

Referring back to FIG. 2, within the range L16 from the host vehicle 300, the direct pixel array 112 can effectively measure the distance to the target object 1. Thus, the range within which the distance to the host vehicle 300 is denoted by L16 or less will hereinafter be defined as a direct TOF zone. Within the range L4 from the host vehicle 300, the indirect pixel array 114 can effectively measure the distance to the target object 1. Thus, the range within which the distance to the host vehicle 300 is denoted by L4 or less will hereinafter be defined as an indirect TOF zone. Each of L0 to L16 may correspond to a value indicating a specific distance, and the spacing between Ln (where "n" is any one of 0 to 15) and L(n+1) may be constant. The length of the direct TOF zone may be four times the length of the indirect TOF zone. The range and the length of the direct TOF zone or the indirect TOF zone as discussed above are examples only and other implementations are also possible.

As can be seen from FIG. 2, it is assumed that first to fourth vehicles VH1~VH4 are respectively located at four different positions in a forward direction of the host vehicle 300. Since the first to fourth vehicles VH1~VH4 are included in the direct TOF zone, the distance between the host vehicle 300 and each of the vehicles VH1~VH4 can be sensed using the direct TOF method. However, since the first to third vehicles VH1~VH3 are not included in the indirect TOF zone, the distance between the host vehicle 300 and each of the vehicles VH1~VH3 cannot be sensed using the indirect TOF method. Thus, each of the first to third vehicles VH1~VH3 may sense the distance to the host vehicle 300 using the direct TOF method only. Meanwhile, since the fourth vehicle VH4 may be included in the direct TOF zone and in the indirect TOF zone, the fourth vehicle VH4 may sense the distance to the host vehicle 300 using the direct TOF method or the indirect TOF method.

A forward region of the host vehicle 300 may be classified into a hot zone and a monitoring zone based on the distance to the host vehicle 300. The hot zone may correspond to an area distanced from the host vehicle 300 by the distance that is equal to or shorter than a threshold distance (e.g., L4). In the hot zone, the distance to a target object is relatively short and thus the sensing of the position of the target object in the hot zone requires high level of accuracy. The monitoring zone may correspond to an area distanced from the host vehicle 300 by the distance that is longer than a threshold value (e.g., L4). In the monitoring zone, since the distance to a target object is relatively long, the sensing of an existence of the target object in a forward region (e.g., the presence or an absence of the target object) is required while the sensing of the position of the target object in the monitoring does not require that high level of accuracy.

In more detail, in the hot zone, a method for sensing the distance to a target object using the indirect TOF method having a higher spatial resolution may be considered more advantageous. In the monitoring zone, a method for sensing the distance to a target object using the direct TOF method having a longer effective measurement distance may be considered more advantageous. For example, the distance to each of the first to third vehicles VH1~VH3 may be more advantageously sensed using the direct TOF method, and the distance to the fourth vehicle VH4 may be more advantageously sensed using the indirect TOF method. As can be seen from FIG. 2, the distance to the first vehicle VH1 may be denoted by L13, the distance to the second vehicle VH2 may be denoted by L9, the distance to the third vehicle VH3 may be denoted by L4, and the distance to the fourth vehicle VH4 may be denoted by L1.

In some implementations, the hot zone may be identical to the indirect TOF zone, and the monitoring zone may refer to a region obtained by subtracting the indirect TOF zone from the direct TOF zone. In some other implementations, the hot zone may be larger or smaller than the indirect TOF zone.

Although FIG. 2 shows the exemplary case in which the photographing device is embedded in the vehicle as the example, other implementations are also possible, and the photographing device may be embedded in other devices.

The method for selectively using the direct TOF method or the indirect TOF method in response to the distance to the target object can be applied to, for example, a face/iris recognition mode implemented by a wake-up function from among sleep-mode operations of a mobile phone, and can be applied to a surveillance mode for detecting the presence or absence of a target object using a CCTV, and a photographing mode for precisely photographing the target object.

Figure 3:
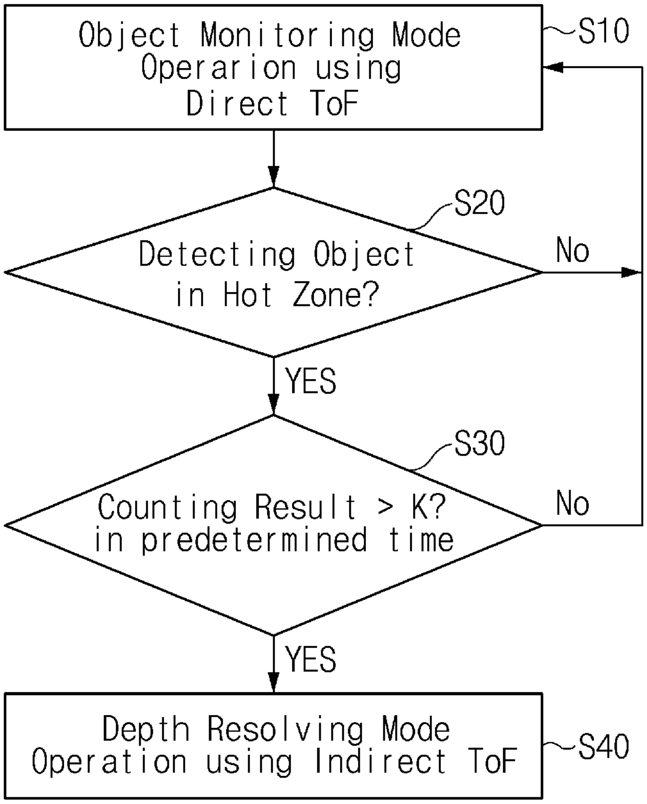
FIG. 3 is a flowchart illustrating an example of operations for each mode of the image sensing device shown in FIG. 1 based on some implementations of the disclosed technology.

FIG. 3 is a flowchart illustrating an example of operations for each mode of the image sensing device 100 shown in FIG. 1 based on some implementations of the disclosed technology.

Referring to FIGS. 2 and 3, the image sensing device 100 may operate in an object monitoring mode or in a depth resolving mode under control of the image signal processor 200. In the object monitoring mode, the direct pixel array 112, the direct pixel driver 120, and the direct readout circuit 140 may be activated, the indirect pixel array 114, the indirect pixel driver 130, and the indirect readout circuit 150 may be deactivated. In the depth resolving mode, the indirect pixel array 114, the indirect pixel driver 130, and the indirect readout circuit 150 may be activated, the direct pixel array 112, the direct pixel driver 120, and the direct readout circuit 140 may be deactivated.

If the distance sensing operation of the image sensing device 100 is started, the image sensing device 100 operates in the object monitoring mode by default and generates digital data indicating the distance to a target object using the direct TOF method (step S10).

The image sensing device 100 may transmit digital data generated from the direct pixel array 112 to the image signal processor 200. The image signal processor 200 may calculate a distance to a target object based on the digital data, and may determine whether the calculated distance to the target object is equal to or shorter than a threshold distance for determining the range of a hot zone, such that the image signal processor 200 can thus determine whether the target object is detected in the hot zone (step S20).

If the calculated distance to the target object is longer than the threshold distance (i.e., "No" in step S20), the image sensing device 100 may continuously operate in the object monitoring mode. For example, if the target object is any one of the first to third vehicles VH1~VH3 shown in FIG. 2, the image sensing device 100 may continuously operate in the object monitoring mode.

If the calculated distance to the target object is equal to or shorter than the threshold distance (i.e., "Yes" in step S20), the image signal processor 200 may increase the counted resultant value stored in a mode counter embedded therein by a predetermined value (e.g., "1"). In addition, the image signal processor 200 may determine whether the counted resultant value stored in the mode counter is higher than a predetermined mode switching value K (where K is an integer) in step S30. If a predetermined time (or an initialization time) has elapsed, or if the operation mode of the image sensing device 100 switches from the object monitoring mode to the depth resolving mode, the counted resultant value may be initialized. Therefore, within the predetermined time (or the initialization time), the image signal processor 200 may determine whether a specific event in which the calculated distance to the target object is equal to or shorter than the threshold distance has occurred a predetermined number of times or more. As a result, an exemplary case in which the counted resultant value is unexpectedly changed due to erroneous detection, or an exemplary case in which the target object is temporarily located in the hot zone may be excluded.

If the counted resultant value is equal to or less than a predetermined mode switching value K (i.e., "No" in step S30), the image sensing device 100 may continuously operate in the object monitoring mode. For example, if the target object has temporarily existed at the position of the fourth vehicle VH4 shown in FIG. 2, or if erroneous detection has occurred, the image sensing device 100 may continuously operate in the object monitoring mode.

If the counted resultant value is higher than the predetermined mode switching value K (i.e., "Yes" in step S30), the image signal processor 200 may allow the operation mode of the image sensing device 100 to switch from the object monitoring mode to the depth resolving mode. Accordingly, the image sensing device 100 may generate digital data indicating the distance to the target object using the indirect TOF method (step S40). On the other hand, the image signal processor 200 may perform switching of the operation mode of the image sensing device 100, and may then initialize the counted resultant value.

In addition, if the image signal processor 200 determines that the target object 1 is not present in the hot zone based on digital data received from the image sensing device 100, the image signal processor 200 may finish the depth resolving mode. In this case, the image signal processor 200 may control the image sensing device 100 to re-perform step S10.

Therefore, if the distance to the target object is equal to or shorter than the threshold distance (i.e., if the target object is located in the hot zone), the image sensing device 100 may sense the distance to the target object using the indirect TOF method (i.e., by activating the indirect pixel array 114). If the distance to the target object is longer than the threshold value (i.e., if the target object is located in the monitoring zone), the image sensing device 100 may sense the distance to the target object using the direct TOF method (i.e., by activating the direct pixel array 112). That is, an optimum operation mode can be selected according to the distance to the target object. In addition, in the object monitoring mode in which precise distance sensing need not be used, only some direct pixels from among the direct pixels may be activated, resulting in reduction in power consumption. Methods for activating the pixels included in the pixel array 110 during the respective operation modes will be described later with reference to FIGS. 10 to 13.

Figure 4:
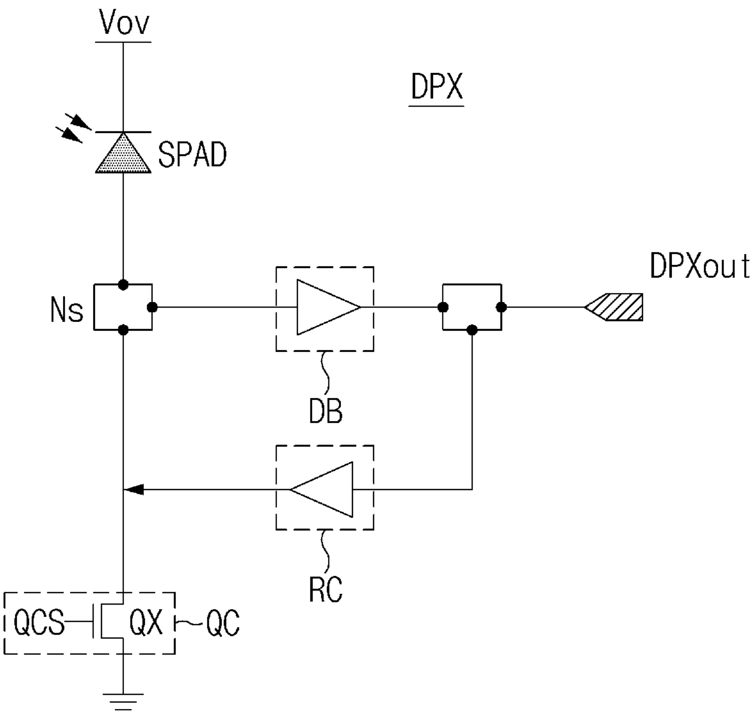
FIG. 4 is an equivalent circuit illustrating an example of a direct pixel included in a direct pixel array shown in FIG. 1 based on some implementations of the disclosed technology.

FIG. 4 is an equivalent circuit illustrating an example of a direct pixel DPX included in the direct pixel array 112 shown in FIG. 1 based on some implementations of the disclosed technology.

The direct pixel array 112 may include a plurality of direct pixels (DPXs). Although it is assumed that each direct pixel (DPX) shown in FIG. 4 is a single-photon avalanche diode (SPAD) pixel for convenience of description, other implementations are also possible.

The direct pixel (DPX) may include a single-photon avalanche diode (SPAD), a quenching circuit (QC), a digital buffer (DB), and a recharging circuit (RC).

The SPAD may sense a single photon reflected by the target object 1, and may thus generate a current pulse corresponding to the sensed single photon. The SPAD may be a photodiode provided with a photosensitive P-N junction. In the SPAD, avalanche breakdown may be triggered by a single photon received in a Geiger mode that receives a reverse bias voltage generated when a cathode-to-anode voltage is higher than a breakdown voltage, resulting in formation of a current pulse. As described above, the above-mentioned process for forming the current pulse through avalanche breakdown triggered by the single photon will hereinafter be referred to as an avalanche process.

One terminal of the SPAD may receive a first bias voltage (Vov) for applying a reverse bias voltage (hereinafter referred to as an operation voltage) higher than a breakdown voltage to the SPAD. For example, the first bias voltage (Vov) may be a positive (+) voltage having an absolute value that is lower than an absolute value of a breakdown voltage. The other terminal of the SPAD may be coupled to a sensing node (Ns), and the SPAD may output a current pulse generated by sensing the single photon to the sensing node (Ns).

The quenching circuit (QC) may control the reverse bias voltage applied to the SPAD. If a time period (or a predetermined time after pulses of the clock signal (MLS) have been generated) in which the avalanche process can be carried out has elapsed, a quenching transistor (QX) of the quenching circuit (QC) may be turned on in response to a quenching control signal (QCS) such that the sensing node (Ns) can be electrically coupled to a ground voltage. As a result, the reverse bias voltage applied to the SPAD may be reduced to a breakdown voltage or less, and the avalanche process may be quenched (or stopped).

The digital buffer (DB) may perform sampling of an analog current pulse to be input to the sensing node (Ns), such that the digital buffer (DB) may convert the analog current pulse into a digital pulse signal. In this example, the sampling of the analog current pulse may be performed by converting the analog current pulse into the digital pulse signal having a logic level "0" or "1" based on a determination whether the level of a current pulse is equal to or higher than a threshold level. However, the sampling method is not limited to thereto and other implementations are also possible. Therefore, the pulse signal generated from the digital buffer (DB) may be denoted by a direct pixel output signal (DPXout), such that the pulse signal denoted by the direct pixel output signal (DPXout) can be transferred to the direct readout circuit 140.

After the avalanche process is quenched by the quenching circuit (QC), the recharging circuit (RC) may implant or provide charges into the sensing node (Ns) such that the SPAD can re-enter the Geiger mode in which avalanche breakdown can be induced. For example, the recharging circuit (RC) may include a switch (e.g., a transistor) that can selectively connect a second bias voltage to the sensing node (Ns) in response to a recharging control signal. If the switch is turned on, the voltage of the sensing nose (Ns) may reach the second bias voltage. For example, the sum of the absolute value of the second bias voltage and the absolute value of the first bias voltage may be higher than the absolute value of the breakdown voltage, and the second bias voltage may be a negative (−) voltage. Therefore, the SPAD may enter the Geiger mode, such that the SPAD may perform the avalanche process by the single photon received in a subsequent time.

In the example, each of the quenching circuit (QC) and the recharging circuit (RC) is implemented as an active device, other implementations are also possible. Thus, in some implementations, each of the quenching circuit (QC) and the recharging circuit (RC) may also be implemented as a passive device. For example, the quenching transistor (QX) of the quenching circuit (QC) may also be replaced with a resistor.

The quenching control signal (QCS) and the recharging control signal may be supplied from the direct pixel driver 120 shown in FIG. 1.

The direct readout circuit 140 may include a digital logic circuit configured to generate digital data by calculating a time delay between a pulse signal of the direct pixel (DPX) and a reference pulse, and an output buffer configured to store the generated digital data. The digital logic circuit and the output buffer may hereinafter be collectively referred to as a Time-to-Digital Circuit (TDC). In this case, the reference pulse may be a pulse of the clock signal (MLS).

Figure 5:
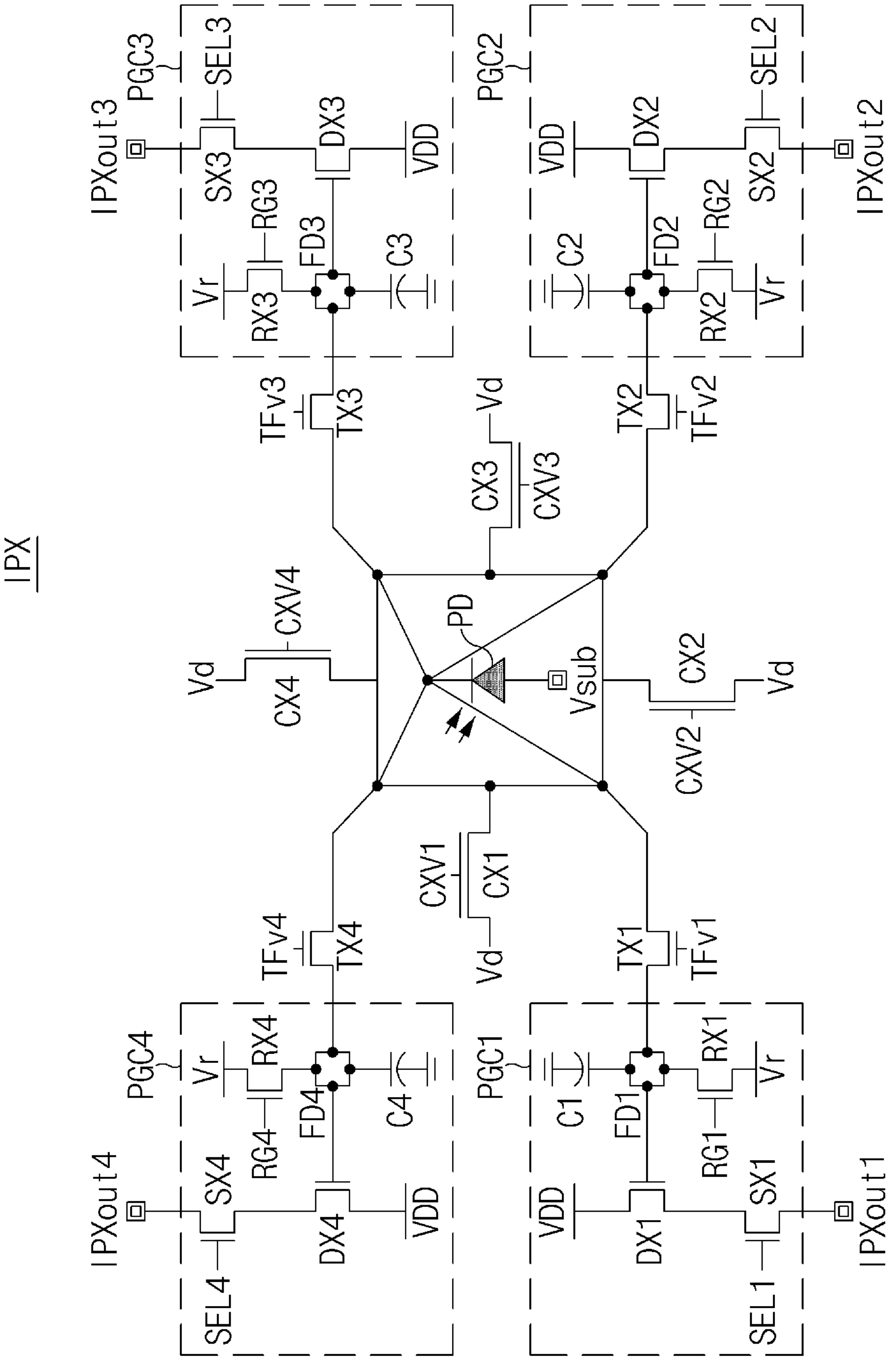
FIG. 5 is an equivalent circuit illustrating an example of an indirect pixel included in an indirect pixel array shown in FIG. 1 based on some implementations of the disclosed technology.

FIG. 5 is an equivalent circuit illustrating an example of the indirect pixel IPX included in the indirect pixel array 114 shown in FIG. 1 based on some implementations of the disclosed technology.

The indirect pixel array 114 may include a plurality of indirect pixels (IPXs). Although it is assumed that each indirect pixel (IPX) shown in FIG. 5 is a circulation pixel for convenience of description, other implementations are also possible.

The indirect pixel (IPX) may include a plurality of transfer transistors TX1~TX4, a plurality of circulation transistors CX1~CX4, and a plurality of pixel signal generation circuits PGC1~PGC4.

The photoelectric conversion element PD may perform photoelectric conversion of incident light reflected from the target object 1, and may thus generate and accumulate photocharges. For example, the photoelectric conversion element PD may be implemented as a photodiode, a pinned photodiode, a photogate, a phototransistor or a combination thereof. One terminal of the photoelectric conversion element PD may be coupled to a substrate voltage (Vsub), and the other terminal of the photoelectric conversion element PD may be coupled to the plurality of transfer transistors TX1~TX4 and the plurality of circulation transistors CX1~CX4. In this case, the substrate voltage (Vsub) may be a voltage (for example, a ground voltage) that is applied to the substrate in which the photoelectric conversion element PD is formed.

The transfer transistor TX1 may transfer photocharges stored in the photoelectric conversion element PD to the floating diffusion (FD) region FD1 in response to a transfer control signal TFv1. The transfer transistor TX2 may transfer photocharges stored in the photoelectric conversion element PD to the floating diffusion (FD) region FD2 in response to a transfer control signal TFv2. The transfer transistor TX3 may transfer photocharges stored in the photoelectric conversion element PD to the floating diffusion (FD) region FD3 in response to a transfer control signal TFv3. The transfer transistor TX4 may transfer photocharges stored in the photoelectric conversion element PD to the floating diffusion (FD) region FD4 in response to a transfer control signal TFv4. Each of the transfer control signals TFv1~TFv4 may be received from the indirect pixel driver 130.

The circulation transistors CX1~CX4 may be turned on or off in response to the circulation control signals CXV1~CXV4. In more detail, the circulation transistor CX1 may be turned on or off in response to the circulation control signal CXV1, the circulation transistor CX2 may be turned on or off in response to the circulation control signal CXV2, the circulation transistor CX3 may be turned on or off in response to the circulation control signal CXV3, and the circulation transistor CX4 may be turned on or off in response to the circulation control signal CXV4. One terminal of each of the circulation transistors CX1~CX4 may be coupled to the photoelectric conversion element PD, and the other terminal of each of the circulation transistors CX1~CX4 may be coupled to a drain voltage (Vd). During a modulation period in which photocharges generated by the photoelectric conversion element PD are collected and transmitted to the floating diffusion (FD) regions FD1~FD4, the drain voltage (Vd) may be at a low-voltage (e.g., a ground voltage) level. During a readout period after lapse of the modulation period, the drain voltage (Vd) may be at a high-voltage (e.g., a power-supply voltage) level. In addition, the circulation control signals CXV1~CXV4 may respectively correspond to the circulation control voltages Vcir1~Vcir4 (see FIG. 6) during the modulation period, such that each of the circulation transistors CX1~CX4 may enable photocharges generated by the photoelectric conversion element PD to move in a predetermined direction (for example, in a counterclockwise direction). In addition, each of the circulation control signals CXV1~CXV4 may correspond to a draining control voltage (Vdrain) (see FIG. 6) during the readout period, such that each of the circulation transistors CX1~CX4 may fix a voltage level of the photoelectric conversion element PD to the drain voltage (Vd). Each of the circulation control signals CXV1~CXV4 may be received from the indirect pixel driver 130.

The pixel signal generation circuits PGC1~PGC4 may store photocharges transferred from the transfer transistors TX1~TX4, and may output indirect pixel output signals IPXout1~IPXout4 indicating electrical signals corresponding to the stored photocharges to the indirect readout circuit 150. In more detail, the pixel signal generation circuit PGC1 may store photocharges transferred from the transfer transistor TX1, and may output an indirect pixel output signal IPXout1 indicating an electrical signal corresponding to the stored photocharges to the indirect readout circuit 150. The pixel signal generation circuit PGC2 may store photocharges transferred from the transfer transistor TX2, and may output an indirect pixel output signal IPXout2 indicating an electrical signal corresponding to the stored photocharges to the indirect readout circuit 150. The pixel signal generation circuit PGC3 may store photocharges transferred from the transfer transistor TX3, and may output an indirect pixel output signal IPXout3 indicating an electrical signal corresponding to the stored photocharges to the indirect readout circuit 150. The pixel signal generation circuit PGC4 may store photocharges transferred from the transfer transistor TX4, and may output an indirect pixel output signal IPXout4 indicating an electrical signal corresponding to the stored photocharges to the indirect readout circuit 150. In some implementations, the pixel signal generation circuits PGC1~PGC4 may be simultaneously or sequentially operated. The indirect pixel output signals IPXout1~IPXout4 may correspond to different phases, and the image signal processor 200 may calculate the distance to the target object 1 by calculating a phase difference in response to digital data generated from the indirect pixel output signals IPXout1~IPXout4.

The structures and operations of the pixel signal generation circuits PGC1~PGC4 may be discussed later using the pixel signal generation circuit PGC1 as an example and such descriptions will be also considered for the remaining pixel signal generation circuits PGC2~PGC4. Thus, redundant descriptions for the pixel signal generation circuits PGC2~PGC4 will be omitted for brevity.

The pixel signal generation circuit PGC1 may include a reset transistor RX1, a capacitor C1, a drive transistor DX1, and a selection transistor SX1.

The reset transistor RX1 may be coupled between a reset voltage (Vr) and the floating diffusion (FD) region FD1, and may be turned on or off in response to a reset control signal RG1. For example, the reset voltage (Vr) may be a power-supply voltage. Whereas the turned-off reset transistor RX1 can sever electrical connection between the reset voltage (Vr) and the floating diffusion (FD) region FD1, the turn-on reset transistor RX1 can electrically connect the reset voltage (Vr) to the floating diffusion (FD) region FD1 such that the floating diffusion (FD) region FD1 can be reset to the reset voltage (Vr).

The capacitor C1 may be coupled between the ground voltage and the floating diffusion (FD) region FD1, such that the capacitor C1 may provide electrostatic capacity in a manner that the floating diffusion (FD) region FD1 can accumulate photocharges received through the transfer transistor TX1. For example, the capacitor C1 may be implemented as a junction capacitor.

The drive transistor DX1 may be coupled between the power-supply voltage (VDD) and the selection transistor SX1, and may generate an electrical signal corresponding to a voltage level of the floating diffusion (FD) region FD1 coupled to a gate terminal thereof.

The selection transistor SX1 may be coupled between the drive transistor DX1 and an output signal line, and may be turned on or off in response to the selection control signal SEL1. When the selection transistor SX1 is turned off, the selection transistor SX1 may not output the electrical signal of the drive transistor DX1 to the output signal line, and when the selection transistor is turned-on, the selection transistor SX1 may output the electrical signal of the drive transistor DX1 to the output signal line. In this case, the output signal line may be a line through which the indirect pixel output signal (IPXout1) of the indirect pixel (IPX) is applied to the indirect readout circuit 150, and other pixels belonging to the same column as the indirect pixel (IPX) may also output the indirect pixel output signals through the same output signal line.

Each of the reset control signal RG1 and the selection control signal SEL1 may be provided from the indirect pixel driver 130.

Figure 6:
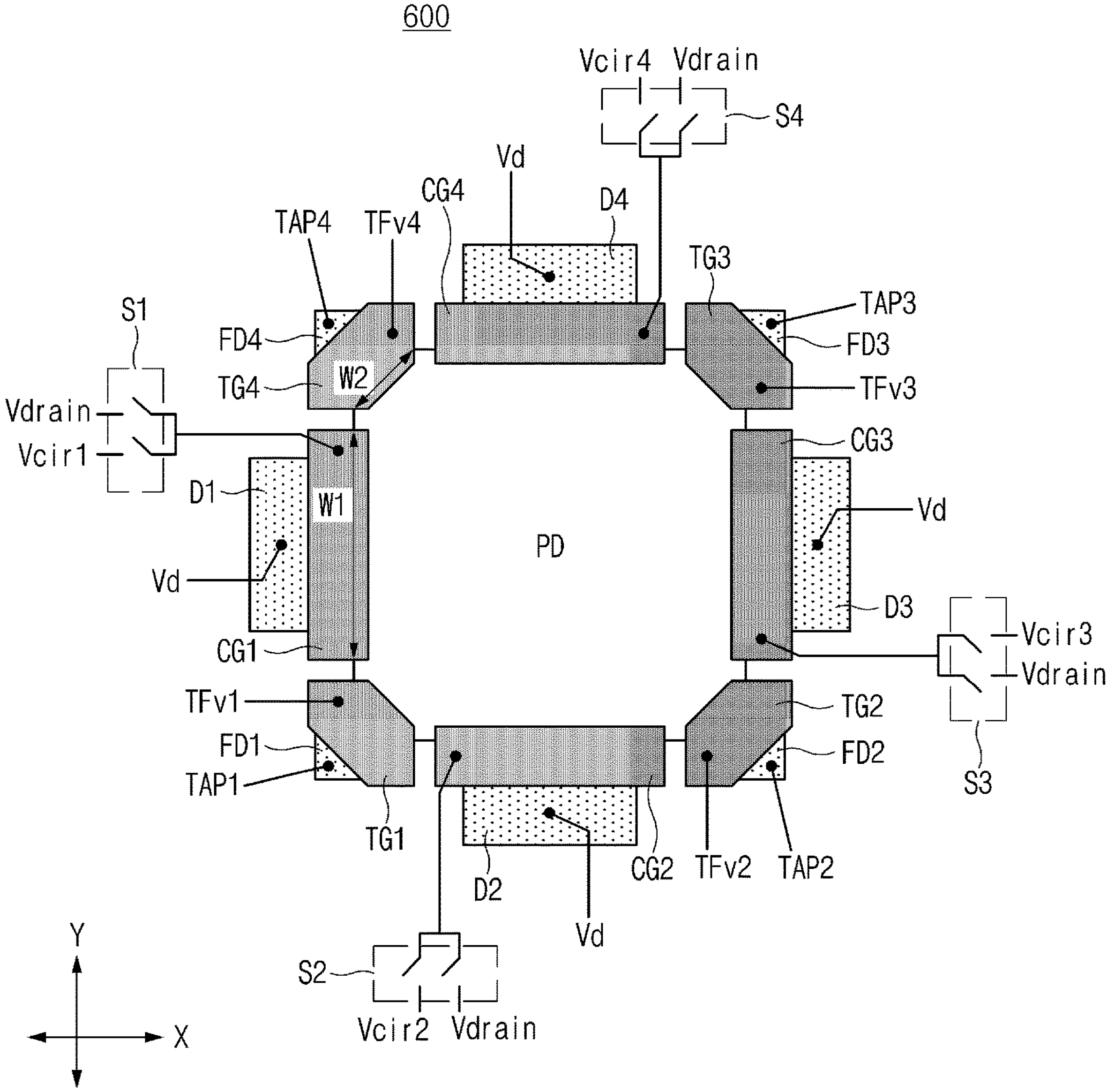
FIG. 6 is a plan view illustrating an example of the indirect pixel shown in FIG. 5 based on some implementations of the disclosed technology.

FIG. 6 is a plan view 600 illustrating an example of the indirect pixel (IPX) shown in FIG. 5 based on some implementations of the disclosed technology.

Referring to FIG. 6, a plan view 600 illustrating some parts of the indirect pixel (IPX) is illustrated. The plan view 600 illustrating some parts of the indirect pixel (IPX) may include a photoelectric conversion element PD, a plurality of floating diffusion (FD) regions FD1~FD4, a plurality of drain nodes D1~D4, a plurality of transfer gates TG1~TG4, and a plurality of circulation gates CG1~CG4. The transfer gates TG1~TG4 may respectively correspond to gates of the transfer transistors TX1~TX4 shown in FIG. 5. Thus, the transfer gate TG1 may correspond to a gate of the transfer transistor TX1, the transfer gate TG2 may correspond to a gate of the transfer transistor TX2, the transfer gate TG3 may correspond to a gate of the transfer transistor TX3, and the transfer gate TG4 may correspond to a gate of the transfer transistor TX4. In addition, the circulation gates CG1~CG4 may respectively correspond to gates of the circulation transistors CX1~CX4 shown in FIG. 5. Thus, the circulation gate CG1 may correspond to a gate of the circulation transistor CX1, the circulation gate CG2 may correspond to a gate of the circulation transistor CX2, the circulation gate CG3 may correspond to a gate of the circulation transistor CX3, and the circulation gate CG4 may correspond to a gate of the circulation transistor CX4. In addition, the drain nodes D1~D4 may respectively correspond to terminals of the circulation transistors CX1~CX4 each receiving the drain voltage (Vd) as an input. In more detail, the drain node D1 may correspond to a terminal of the circulation transistor CX1 receiving the drain voltage (Vd), the drain node D2 may correspond to a terminal of the circulation transistor CX2 receiving the drain voltage (Vd), the drain node D3 may correspond to a terminal of the circulation transistor CX3 receiving the drain voltage (Vd), and the drain node D4 may correspond to a terminal of the circulation transistor CX4 receiving the drain voltage (Vd).

The photoelectric conversion element PD may be formed in a semiconductor substrate, and may be surrounded by the plurality of gates TG1~TG4 and CG1~CG4.

Each of the floating diffusion (FD) regions FD1~FD4 may be located at one side of each of the transfer gates TG1~TG4 corresponding thereto. In more detail, the floating diffusion (FD) region FD1 may be located at one side of the transfer gate TG1, the floating diffusion (FD) region FD2 may be located at one side of the transfer gate TG2, the floating diffusion (FD) region FD3 may be located at one side of the transfer gate TG3, and the floating diffusion (FD) region FD4 may be located at one side of the transfer gate TG4. Signals corresponding to the amount of photocharges stored in the floating diffusion (FD) regions FD1~FD4 may be respectively output as tap signals TAP1~TAP4 corresponding to the floating diffusion (FD) regions FD1~FD4. In more detail, a signal corresponding to the amount of photocharges stored in the floating diffusion (FD) region FD1 may be output as a tap signal TAP1, a signal corresponding to the amount of photocharges stored in the floating diffusion (FD) region FD2 may be output as a tap signal TAP2, a signal corresponding to the amount of photocharges stored in the floating diffusion (FD) region FD3 may be output as a tap signal TAP3, and a signal corresponding to the amount of photocharges stored in the floating diffusion (FD) region FD4 may be output as a tap signal TAP4. The tap signals TAP1~TAP4 may be respectively applied to gates of the drive transistors DX1~DX4 corresponding thereto through conductive lines. In addition, the tap signals TAP1~TAP4 may be respectively applied to terminals of the reset transistors RX1~RX4 corresponding thereto through conductive lines. Each of the floating diffusion (FD) regions FD1~FD4 may include an impurity region that is formed by implanting N-type impurities into a semiconductor substrate to a predetermined depth.

The drain nodes D1~D4 may be respectively located at one sides of the circulation gates CG1~CG4 corresponding thereto, and may be coupled to the drain voltage (Vd) through conductive lines. Each of the drain nodes D1~D4 may include an impurity region that is formed by implanting N-type impurities into a semiconductor substrate to a predetermined depth.

The transfer gates TG1~TG4 may be respectively arranged at different positions corresponding to vertex points of a rectangular ring shape surrounding the photoelectric conversion element PD.

The circulation gates CG1~CG4 may be respectively disposed in regions corresponding to four sides of the rectangular ring shape surrounding the photoelectric conversion element PD. During the modulation period, the circulation gates CG1~CG4 may sequentially and consecutively receive circulation control voltages Vcir1~Vcir4 in a predetermined direction (for example, a counterclockwise direction), such that the circulation gates CG1~CG4 may partially generate an electric field in an edge region of the photoelectric conversion element PD and may enable the electric field to be changed along the corresponding direction at intervals of a predetermined time. Photocharges stored in the photoelectric conversion element PD may move from one place to another place in the direction in which the electric field is generated and changed.

In this case, each of the circulation control voltages Vcir1~Vcir4 may have a potential level that is unable to electrically connect the photoelectric conversion element PD to each of the drain nodes D1~D4. Thus, during the modulation period, the circulation gates CG1~CG4 may not turn on the circulation transistors CX1~CX4 corresponding thereto, and may perform only the role of moving photocharges of the photoelectric conversion element PD.

During the readout period, each of the circulation gates CG1~CG4 may fix a voltage level of the photoelectric conversion element PD to the drain voltage (Vd) by the draining control voltage (Vdrain), such that the circulation gates CG1~CG4 can prevent noise from flowing into the photoelectric conversion element PD, resulting in no signal distortion. For example, when the draining control voltage (Vdrain) is activated to a logic high level, each of the circulation gates (CG1~CG4) may have a high potential that can electrically connect the photoelectric conversion element PD to each of the drain nodes D1~D4. Thus, the activated draining control voltage (Vdrain) may have a higher voltage than each of the activated circulation control voltages Vcir1~Vcir4.

Accordingly, during the readout period, the draining control voltage (Vdrain) may be activated to a logic high level. In this case, since each of the drain nodes D1~D4 is electrically coupled to the photoelectric conversion element PD, the photoelectric conversion element PD may be fixed to a high drain voltage (Vd), such that residual photocharges in the photoelectric conversion element PD can be drained.

The circulation gate CG1 may receive the circulation control signal CXV1 that corresponds to either the circulation control voltage (Vcir1) or the draining control voltage (Vdrain) based on the switching operation of the switching element S1 corresponding to the circulation gate CG1. The circulation gate CG2 may receive the circulation control signal CXV2 that corresponds to either the circulation control voltage (Vcir2) or the draining control voltage (Vdrain) based on the switching operation of the switching element S2 corresponding to the circulation gate CG2. The circulation gate CG3 may receive the circulation control signal CXV3 that corresponds to either the circulation control voltage (Vcir3) or the draining control voltage (Vdrain) based on the switching operation of the switching element S3 corresponding to the circulation gate CG3. The circulation gate CG4 may receive the circulation control signal CXV4 that corresponds to either the circulation control voltage (Vcir4) or the draining control voltage (Vdrain) based on the switching operation of the switching element S4 corresponding to the circulation gate CG4. In more detail, during the modulation period, the circulation gates CG1~CG4 may respectively receive the circulation control voltages Vcir1~Vcir4. During the readout period, each of the circulation gates CG1~CG4 may receive the draining control voltage (Vdrain). Although the switching elements S1~S4 may be included in the pixel driver 130, other implementations are also possible.

The transfer gates TG1~TG4 and the circulation gates CG1~CG4 may be spaced apart from each other by a predetermined distance while being arranged alternately with each other over the semiconductor substrate. When viewed in a plane, the transfer gates TG1~TG4 and the circulation gates CG1~CG4 may be arranged in a ring shape that surrounds the photoelectric conversion element PD.

The circulation gates CG1 and CG3 may be respectively arranged at both sides of the photoelectric conversion element PD in a first direction with respect to the photoelectric conversion element PD at an upper portion of the semiconductor substrate. The circulation gates CG2 and CG4 may be respectively arranged at both sides of the photoelectric conversion element PD in a second direction with respect to the photoelectric conversion element PD. For example, the circulation gates CG1~CG4 may be respectively disposed in regions corresponding to four sides of the rectangular ring shape surrounding the photoelectric conversion element PD. In this case, the circulation gates CG1~CG4 may be arranged to partially overlap with the photoelectric conversion element PD On the other hand, each of the transfer gates TG1~TG4 may be spaced apart from two contiguous or adjacent circulation gates by a predetermined distance, and may be disposed between the two contiguous or adjacent circulation gates. For example, the transfer gates TG1~TG4 may be disposed in regions corresponding to vertex points of the rectangular ring shape, and may be arranged to partially overlap with the photoelectric conversion element PD.

Figure 7:
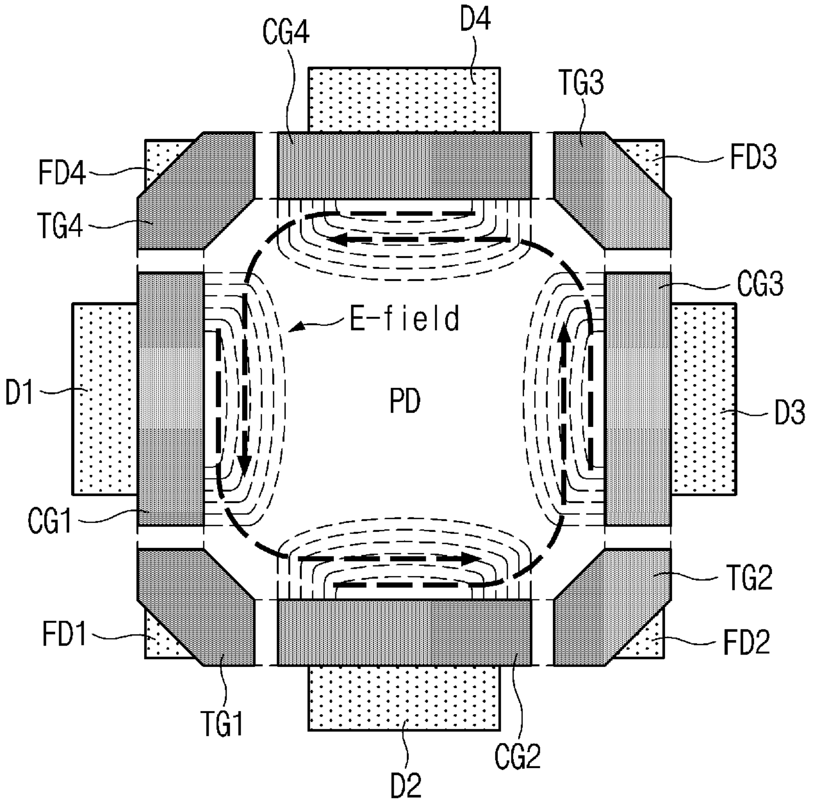
FIG. 7 is a conceptual diagram illustrating how photocharges are moving by circulation gates in the indirect pixel shown in FIG. 6 based on some implementations of the disclosed technology.

FIG. 7 illustrates moves of photocharges by the circulation gates CG1~CG4 in the indirect pixel shown in FIG. 6 based on some implementations of the disclosed technology.

Referring to FIG. 7, when the circulation control voltages Vcir1~Vcir4 are respectively applied to the circulation gates CG1~CG4, the electric field may be formed in a peripheral region of the circulation gates CG1~CG4, such that photocharges generated by the photoelectric conversion element PD may move from the edge region of the photoelectric conversion element PD to another region contiguous or adjacent to the circulation gates CG1~CG4. In this case, when the potential of each of the circulation control voltages Vcir1~Vcir4 is less than a predetermined potential that can create a channel capable of electrically coupling the photoelectric conversion element PD to each of the drain nodes D1~D4, photocharges can be accumulated or collected in the peripheral region of the circulation gates CG1~CG4 without moving to the drain nodes D1~D4.

However, as can be seen from FIG. 6, the circulation gates CG1~CG4 are disposed to surround the upper portion of the photoelectric conversion element PD. The circulation control voltages Vcir1~Vcir4 are not applied simultaneously, but are sequentially and consecutively applied to the circulation gates CG1~CG4 in a predetermined direction (for example, a counterclockwise direction), and thus photocharges may move along the edge region of the photoelectric conversion element PD according to a desired sequence of operations of the circulation gates CG1~CG4. As such, photocharges can move in a predetermined direction along the edge region of the photoelectric conversion element PD.

In some implementations, at a first point in time, the circulation control signal (Vcir1) is applied to the circulation gate CG1 and thus the electric field is formed in the peripheral region of the circulation gate CG1. In this case, photocharges generated by the photoelectric conversion element PD can be accumulated near the circulation gate CG1 by the electric field.

After a predetermined time period, at a second point in time, the circulation control signal (Vcir2) is applied to the circulation gate CG2 contiguous or adjacent to the circulation gate CG1, and the circulation control signal (Vcir1) ceases to be applied to the circulation gate CG1. Thus, photocharges accumulated near the circulation gate CG1 may move toward the circulation gate CG2. Thus, photocharges may move from the circulation gate CG1 to the circulation gate CG2.

After a predetermined time period, at a third point in time, the circulation control signal (Vcir3) is applied to the circulation gate CG3 contiguous or adjacent to the circulation gate CG2, and the circulation control signal (Vcir2) ceases to be applied to the circulation gate CG2. Thus, photocharges accumulated near the circulation gate CG2 may move toward the circulation gate CG3. Thus, photocharges may move from the circulation gate CG2 to the circulation gate CG3.

After a predetermined time period, at a fourth point in time, the circulation control signal (Vcir4) is applied to the circulation gate CG4 contiguous or adjacent to the circulation gate CG3, and the circulation control signal (Vcir3) ceases to be applied to the circulation gate CG3. Thus, photocharges accumulated near the circulation gate CG3 may move toward the circulation gate CG4. Thus, photocharges may move from the circulation gate CG3 to the circulation gate CG4.

After a predetermined time period, at a fifth point in time, the circulation control signal (Vcir1) is applied to the circulation gate CG1 contiguous or adjacent to the circulation gate CG4, and the circulation control signal (Vcir4) ceases to be applied to the circulation gate CG4. Thus, photocharges accumulated near the circulation gate CG4 may move toward the circulation gate CG1. Thus, photocharges may move from the circulation gate CG4 to the circulation gate CG1.

If the above-mentioned operations are consecutively and repeatedly carried out, photocharges can be circulated along the edge region of the photoelectric conversion element (PD).

Figure 8:
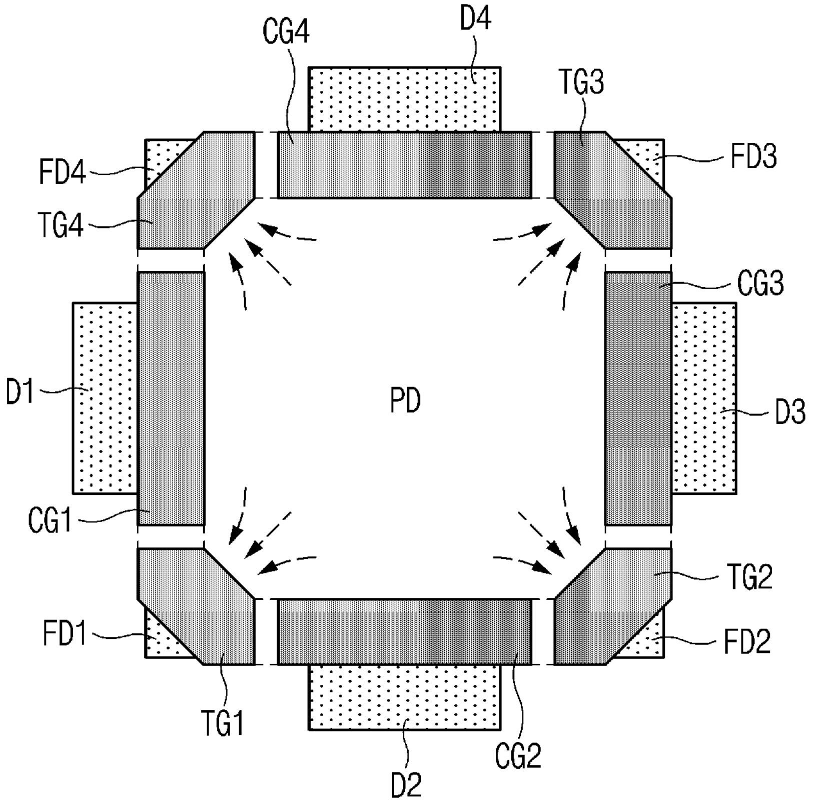
FIG. 8 is a conceptual diagram illustrating how photocharges are moving toward a floating diffusion (FD) region by transfer gates in the indirect pixel shown in FIG. 6 based on some implementations of the disclosed technology.

FIG. 8 is a conceptual diagram illustrating how photocharges are moving toward a floating diffusion (FD) region by transfer gates in the indirect pixel shown in FIG. 6 based on some implementations of the disclosed technology. FIG. 8 illustrates how the indirect pixel shown in FIG. 6 transfers photocharges to the floating diffusion (FD) region by transfer gates.

Referring to FIG. 8, in some implementations, when the transfer control signals TFv1~TFv4 are respectively applied to the transfer gates TG1~TG4, an electrical channel is created in the semiconductor substrate below the transfer gates TG1~TG4 to couple the photoelectric conversion element (PD) to the floating diffusion (FD) regions FD1~FD4. The photocharges generated by the photoelectric conversion element (PD) can be transferred to the floating diffusion (FD) regions FD1~FD4 through the channel.

The transfer control signals TFv1~TFv4 are not applied simultaneously, but are sequentially and consecutively applied to the transfer gates TG1~TG4 in a predetermined direction (for example, a counterclockwise direction). The transfer control signals TFv1~TFv4 may be sequentially applied to the transfer gates TG1~TG4 according to a desired sequence of operations of the circulation gates CG1~CG4 shown in FIG. 7.

For example, in a situation in which photocharges accumulated near the circulation gate CG1, by activation of the circulation gate CG1, move toward the circulation gate CG2, the transfer control signal (TFv1) can be applied only to the transfer gate TG1 located between the circulation gates CG1 and CG2. In this case, the transfer control signal (TFv1) may have a higher voltage than each of the circulation control voltages Vcir1 and Vcir2.

As described above, in the arrangement structure in which the transfer gate TG1 and the circulation gates CG1 and CG2 are arranged in an L-shape structure, in a situation in which the transfer gate TG1 is located at a vertex position and at the same time the signal (TFv1) applied to the transfer gate TG1 is at a higher voltage level than each of the signals Vcir1 and Vcir2 applied to the circulation gates CG1 and CG2, most parts of photocharges collected by the circulation gates CG1 and CG2 and the transfer gate TG1 may be intensively collected in the region located close to the transfer gate TG1. That is, most parts of the collected photocharges may be concentrated in a narrow region. Therefore, even when the transfer gate TG1 having a relatively small size is used, photocharges can be rapidly transferred to the floating diffusion (FD) region FD1.

In the same manner as described above, in a situation in which photocharges accumulated near the circulation gate CG2 move toward the circulation gate CG3, the transfer control signal (TFv2) can be applied only to the transfer gate TG2 located between the circulation gates CG2 and CG3. In addition, if photocharges accumulated near the circulation gate CG3 move toward the circulation gate CG4, the transfer control signal (TFv3) can be applied only to the transfer gate TG3 located between the circulation gates CG3 and CG4. Likewise, if photocharges accumulated near the circulation gate CG4 move toward the circulation gate CG1, the transfer control signal (TFv4) can be applied only to the transfer gate TG4 located between the circulation gates CG4 and CG1.

Figure 9:
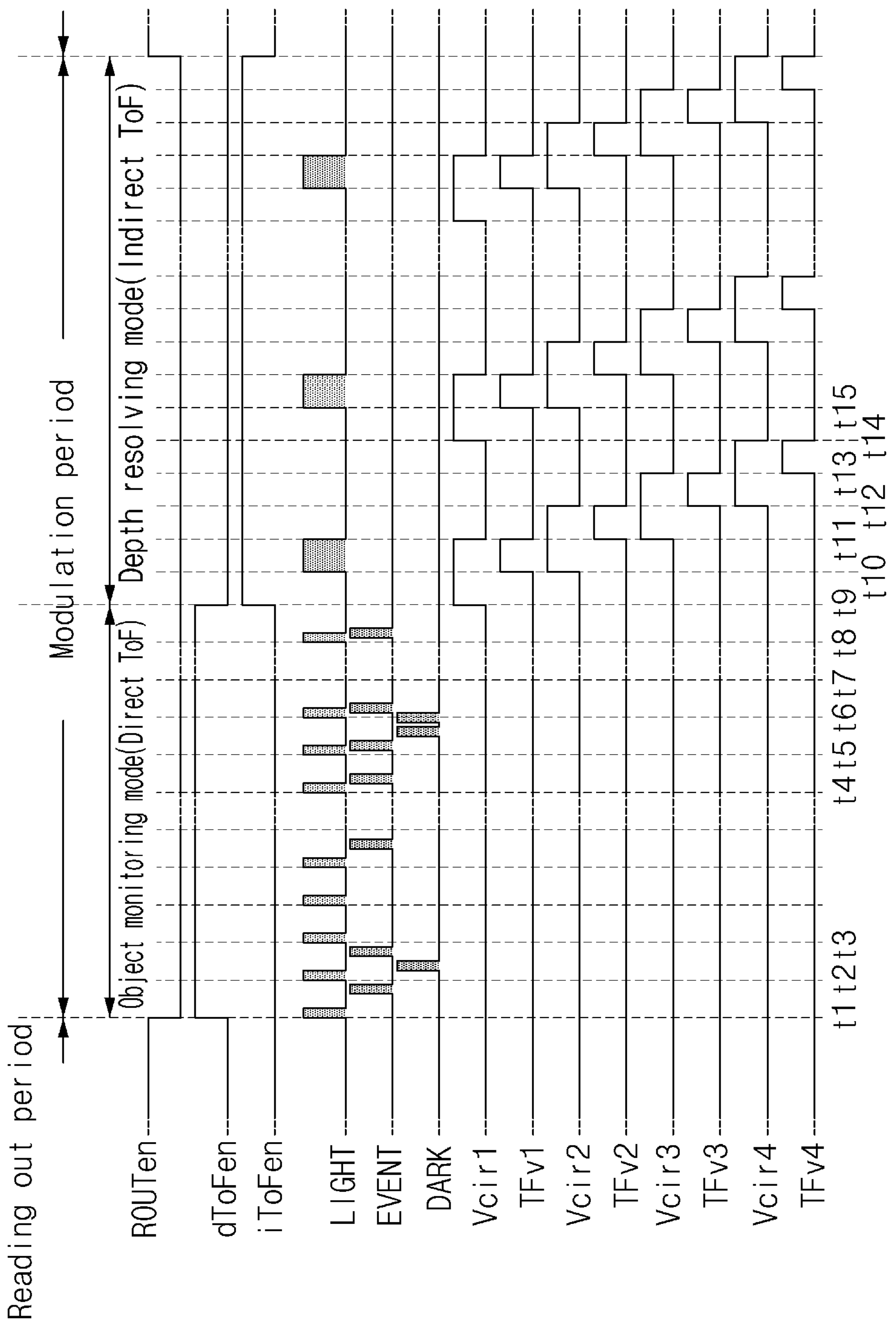
FIG. 9 is a timing diagram illustrating an example of operations of the image sensing device based on some implementations of the disclosed technology.

FIG. 9 is a timing diagram illustrating an example of operations of the image sensing device 100 based on some implementations of the disclosed technology.

Referring to FIG. 9, the operation period of the image sensing device 100 may be broadly classified into a modulation period and a readout period.

The modulation period may refer to a time period in which the light source 10 emits light to a target object 1 under control of the light source driver 170 and senses light reflected from the target object 1 using the direct TOF method or the indirect TOF method.

The readout period may refer to a time period in which the pixel signal generation circuits PGC1~PGC4 of the indirect pixel (IPX) may respectively read the tap signals TAP1~TAP4 corresponding to the amount of photocharges accumulated in the floating diffusion (FD) regions FD1~FD4 during the modulation section, may generate indirect pixel output signals IPXout1~IPXout4 based on the read tap signals TAP1~TAP4, and may thus generate digital data corresponding to the indirect pixel output signals IPXout1~IPXout4. In this case, a direct pixel output signal (DPXout) of the direct pixel (DPX) and digital data corresponding to the direct pixel output signal (DPXout) may be immediately generated as soon as the direct pixel (DPX) senses light, such that the direct pixel output signal (DPXout) and the digital data corresponding thereto can be transferred to the image signal processor 200 in real time. Thus, the readout period may refer to a time period in which the indirect pixel output signals IPXout1~IPXout4 of the indirect pixel (IPX) and digital data corresponding thereto are generated and transferred.

If the readout enable signal (ROUTen) is deactivated to a logic low level at a time point (t1), the modulation period may start operation. If the modulation period starts operation, the image sensing device 100 may operate in the object monitoring mode by default, and may generate digital data indicating the distance to the target object using the direct TOF method. In more detail, a direct TOF enable signal (dToFen) may be activated to a logic high level at the time point (t1). The readout enable signal (ROUTen), the direct TOF enable signal (dToFen), and an indirect TOF enable signal (iToFen) to be described later may be generated by the image signal processor 200, and may thus be transferred to the image sensing device 100.

The image sensing device 100 may repeatedly emit pulse light synchronized with the clock signal (MLS) to the target object 1 at intervals of a predetermined time (for example, t1~t2 or t2~t3). The pulse light may be denoted by "LIGHT" as shown in FIG. 9.

In addition, FIG. 9 illustrates an event signal (EVENT) acting as the direct pixel output signal (DPXout) that is generated when light emitted from the image sensing device 100 is sensed after being reflected from the target object 1. In other words, the event signal (EVENT) may refer to the direct pixel output signal (DPXout) that is generated by sensing light reflected from the target object 1.

On the other hand, FIG. 9 illustrates a signal (DARK) acting as a direct pixel output signal (DPXout) that is generated when a dark noise component (e.g., ambient noise) irrelevant to light emitted from the image sensing device 100 is sensed and generated. That is, the signal (DARK) may refer to the direct pixel output signal (DPXout) that is generated by sensing the dark noise component instead of light reflected from the target object 1.

Light emitted from the image sensing device 100 at the time points t1 and t2 may be reflected by the target object 1, and the reflected light may be sensed, such that the signal (EVENT) may be generated. However, a distance corresponding to a time delay between the signal (LIGHT) and the signal (EVENT) may exceed a threshold distance, and the counted resultant value stored in the mode counter of the image signal processor 200 may not increase.

On the other hand, the signal (DARK) may occur due to the dark noise component in a time period t2~t3. The distance corresponding to a time delay between the signal (LIGHT) and the signal (DARK) may be equal to or less than a threshold distance, and the counted resultant value stored in the mode counter may increase. However, since the counted resultant value does not exceed a mode switching value, switching of the operation mode of the image sensing device 100 may not occur.

Light emitted from the image sensing device 100 at each of the time points t4, t5, and t6 may be sensed after being reflected from the target object 1, such that the signal (EVENT) may occur. The distance corresponding to the time delay between the signal (LIGHT) and the signal (EVENT) may be equal to or less than a threshold distance, and the counted resultant value stored in the mode counter may increase.

Meanwhile, in a time period t4~t7, the signal (DARK) may occur twice due to the dark noise component. The distance corresponding to the time delay between the signal (LIGHT) and the signal (DARK) may exceed or be longer than the threshold distance, and the counted resultant value stored in the mode counter may not increase.

However, assuming that the counted resultant value does not exceed the mode switching value at the time point (t7), switching of the operation mode of the image sensing device 100 may not occur.

That is, if each of the threshold distance, the mode switching value, and the initialization time is set to an appropriate value, erroneous increase of the counted resultant value or erroneous switching of the operation mode may be prevented by the signal DARK. Although each of the threshold distance, the mode switching value, and the initialization time can be experimentally determined in advance, the scope or spirit of the disclosed technology is not limited thereto, and other implementations are also possible. In some implementations, the image signal processor 200 may also dynamically change at least one of the threshold distance, the mode switching value, and the initialization value according to external conditions (e.g., illuminance outside the photographing device, speed of the photographing device, a user request, etc.).

Light emitted from the image sensing device 100 at a time point (t8) may be sensed after being reflected from the target object 1, such that the signal (EVENT) may occur. The distance between the time delay between the signal (LIGHT) and the signal (EVENT) may be equal to or less than a threshold distance, and the counted resultant value stored in the mode counter may increase. Assuming that the counted resultant value exceeds or is higher than the mode switching value at the time point (t8), the image signal processor 200 may allow the operation mode of the image sensing device 100 to switch from the object monitoring mode to the depth resolving mode.

Therefore, at a time point (t9), the direct TOF enable signal (dToFen) may be deactivated to a logic low level, and the indirect TOF enable signal (iToFen) may be activated to a logic high level. Accordingly, the image sensing device 100 may generate digital data indicating the distance to the target object 1 using the indirect TOF method.

During the depth resolving mode after the time point (t9), the image sensing device 100 may repeatedly emit a modulated light synchronized with the clock signal (MLS) to the target object 1 at intervals of a predetermined time (for example, t10~t15).

In the modulation period, the drain voltage (Vd) applied to each of the drain nodes D1~D4 may be at a low-voltage (e.g., a ground voltage) level. In the readout period, the drain voltage (Vd) applied to each of the drain nodes D1~D4 may be at a high-voltage (e.g., a power-supply voltage) level. For example, if the drain voltage (Vd) is at a high-voltage level even in the modulation period, the drain voltage (Vd) may prevent photocharges collected by the circulation gates from moving toward the transfer gate. Therefore the drain voltage (Vd) may be maintained at a low-level level in the modulation period.

At a time point (t9) where the depth resolving mode is started, the circulation control voltage (Vcir1) may be activated. That is, the circulation control voltage (Vcir1) may be applied to the circulation gate CG1 at the time point (t9). In this case, the circulation control voltage (Vcir1) may have a potential level that is unable to electrically connect the photoelectric conversion element PD to the drain node D1. The circulation control voltage (Vcir1) may be activated during a time period t9~t11.

Since the activated circulation control voltage (Vcir1) is applied to the circulation gate CG1, the electric field may be formed in a region that is contiguous or adjacent to the circulation gate CG1 in the edge region of the photoelectric conversion element PD. As a result, photocharges generated by photoelectric conversion of reflected light in the photoelectric conversion element (PD) may move toward the circulation gate CG1 by the electric field, such that the resultant photocharges are accumulated near or collected in the circulation gate CG1.

At a time point (t10), the transfer control signal (TFv1) and the circulation control voltage (Vcir2) may be activated. For example, in the situation in which the circulation control signal (Vcir1) is still activated, if the circulation control signal (Vcir2) is applied to the circulation gate CG2 and at the same time the transfer control signal (TFv1) is applied to the transfer gate TG1, the circulation gates CG1 and CG2 and the transfer gate TG1 can operate at the same time. In this case, the transfer control signal (TFv1) may have a higher voltage than each of the circulation control voltages Vcir1 and Vcir2. The transfer control signal (TFv1) may be activated during a time period t10~t11, and the circulation control voltage (Vcir2) may be activated during a time period t10~t12.

Therefore, photocharges collected near the circulation gate CG1 during the time period t10~t11 may move toward the transfer gate TG1. In addition, photocharges additionally collected by the transfer gate TG1 and the circulation gates CG1 and CG2 during the time period t11~t12 may also move toward the transfer gate TG1.

Whereas the circulation gates CG1 and CG2 and the transfer gate TG1 are arranged in an L-shape structure, the transfer gate TG1 is arranged at a vertex position and a relatively higher potential is applied to the transfer gate TG1, such that photocharges can be intensively collected in the region (i.e., the vertex region) located close to the transfer gate TG1.

The collected photocharges can be transferred to the floating diffusion (FD) region FD1 by the transfer gate TG1. Thus, photocharges are intensively collected in a narrow vertex region, such that photocharges can be rapidly transferred to the floating diffusion (FD) region FD1 using a small-sized transfer gate TG1.

At the time point (t11), the circulation control signal (Vcir1) and the transfer control signal (TFv1) may be deactivated, and the transfer control signal (TFv2) and the circulation control signal (Vcir3) may be activated. Thus, the transfer gate TG1 and the circulation gate CG1 that are located at one side of the circulation gate CG2 may stop operation, and the transfer gate TG2 and the circulation gate CG3 that are located at the other side of the circulation gate CG2 may start operation. In this case, the activated transfer control signal (TFv2) may have a higher voltage than the circulation control voltage (Vcir3).

However, although the transfer control signal (TFv2) and the circulation control signal (Vcir3) are activated, a predetermined time (i.e., a rising time) may be consumed until the potential levels of the transfer control signal (TFv2) and the circulation control voltage (Vcir3) reach a predetermined level at which the gates TG2 and CG3 can actually operate. Thus, there may occur a time period in which the transfer gate TG1 stops operation and the transfer gate TG2 is not yet operated.

Therefore, the circulation control signal (Vcir2) is continuously activated until reaching the time point (t12). As a result, during a predetermined time in which the transfer gate TG2 is not yet operated, photocharges may not be dispersed and move toward the circulation gate CG2. For example, not only photocharges not transferred by the transfer gate TG1, but also newly generated photocharges may move toward the circulation gate CG2.

If the rising time of each of the transfer control signal (TFv2) and the circulation control voltage (Vcir3) has expired, the transfer gate TG2 may operate by the transfer control signal (TFv2) and the circulation gate CG3 may operate by the circulation control signal (Vcir3). Thus, the circulation gates CG2 and CG3 and the transfer gate TG2 may operate at the same time. In this case, since the transfer control signal (TFv2) has a higher voltage than each of the circulation control voltages Vcir2 and Vcir3, photocharges may move toward the transfer gate TG2 and may flow into the floating diffusion (FD) region FD2 by the transfer gate TG2.

At the time point (t12), the circulation control signal (Vcir2) and the transfer control signal (TFv2) may be deactivated, and the transfer control signal (TFv3) and the circulation control signal (Vcir4) may be activated. Thus, the transfer gate TG2 and the circulation gate CG2 that are located at one side of the circulation gate CG3 may stop operation, and the transfer gate TG3 and the circulation gate CG4 that are located at the other side of the circulation gate CG3 may start operation. In this case, the transfer control signal (TFv3) may have a higher voltage than the circulation control voltage (Vcir4).

In this case, the circulation control voltage (Vcir3) is continuously activated until reaching the time point (t13). As a result, during a predetermined time in which the transfer gate TG3 is not yet operated, photocharges may not be dispersed and move toward the circulation gate CG3.

If the rising time of each of the transfer control signal (TFv3) and the circulation control voltage (Vcir4) has expired, the transfer gate TG3 may operate by the transfer control signal (TFv3) and the circulation gate CG4 may operate by the circulation control voltage (Vcir4). Thus, the circulation gates CG3 and CG4 and the transfer gate TG3 may operate at the same time. In this case, since the transfer control signal (TFv3) has a higher voltage than each of the circulation control voltages Vcir3 and Vcir4, photocharges may move toward the transfer gate TG3 and may flow into the floating diffusion (FD) region FD3 by the transfer gate TG3.

At a time point (t13), the circulation control signal (Vcir3) and the transfer control signal (TFv3) may be deactivated, and the transfer control signal (TFv4) may be activated. In this case, the activated transfer control signal (TFv4) may have a higher voltage than the circulation control voltage (Vcir4), and the circulation control signal (Vcir4) may remain activated until reaching the time point (t14).

Therefore, photocharges may move toward the circulation gate CG4. Thereafter, if the rising time of the transfer control signal (TFv4) has expired, photocharges may flow into the floating diffusion (FD) region FD4 by the transfer gate TG4.

The time period t9~t14 may be defined as a first indirect cycle. Until the modulation period is ended, the operation of moving photocharges and the operation of sequentially transferring the moved photocharges to the floating diffusion (FD) regions FD1~FD4 may be repeatedly performed in the same manner as in the time period t9~t14. As can be seen from FIG. 9, the operation corresponding to the first indirect cycle from among the second to m-th indirect cycles (where 'm' is an integer of 3 or more) may be repeatedly performed. As a result, although photoelectric conversion sensitivity of the photoelectric conversion element PD is at a low level or transmission (Tx) efficiency of the transfer gates TG1~TG4 is at a low level, the accuracy of sensing the distance to the target object using the indirect TOF method can be increased or improved. Information about how many times the first indirect cycle is repeated may be experimentally determined in advance in consideration of photoelectric conversion sensitivity of the photoelectric conversion element PD or transmission (Tx) efficiency of the transfer gates TG1~TG4. In some other implementations, the first indirect cycle may not be repeated, and the readout period may be started as soon as the first indirect cycle is ended.

If the modulation period has expired, the readout enable signal (ROUTen) is activated such that the readout period may be started. In this case, the drain voltage (Vd) may be activated to a high-voltage level, and the draining control signal (Vdrain) may also be activated to a high-voltage level. Therefore, the photoelectric conversion element PD may be electrically coupled to the drain nodes D1~D4 by the circulation gates CG1~CG4, such that the voltage level of the photoelectric conversion element PD may be fixed to the drain voltage (Vd) during the readout period.

FIG. 10 is a schematic diagram illustrating an example of some constituent elements included in the image sensing device shown in FIG. 1 based on some implementations of the disclosed technology.

Referring to FIG. 10, the image sensing device 1000 may illustrate one example of some constituent elements included in the image sensing device 100 shown in FIG. 1. The image sensing device 1000 may include a pixel array 1005, a row driver 1050, a modulation driver 1060, a horizontal time-to-digital circuit (TDC) 1070, a vertical TDC 1080, and an indirect readout circuit 1090.

The pixel array 1005 may correspond to the pixel array 110 shown in FIG. 1, and may include a plurality of direct pixels 1010 and a plurality of indirect pixels 1040. Although the pixel array 1005 shown in FIG. 10 based on some implementations of the disclosed technology may include a plurality of pixels arranged in a matrix shape including desired numbers of rows and columns, e.g., 22 rows and 22 columns. In implementations, the number of rows and the number of columns included in the pixel array 1005 may be set as needed. Since the number of rows and the number of columns are determined based on the indirect pixel 1040, the direct pixel different in size from the indirect pixel 1040 may be arranged across two rows and two columns.

The plurality of direct pixels 1010 may be included in a first direct pixel group 1020 and/or a second direct pixel group 1030. Although each direct pixel 1010 may be four times larger than each indirect pixel 1040, the scope or spirit of the disclosed technology is not limited thereto, and other implementations are also possible. This is because the quenching circuit (QC) or the recharging circuit (RC) included in the direct pixel 1010 may be relatively large in size. In some other implementations, the ratio in size between the direct pixel 1010 and the indirect pixel 1040 may be set to a desired ratio for a specific design, for example, "1", "½", "1⁄16", or other ratios.

The first direct pixel group 1020 may include a plurality of direct pixels 1010 arranged in a line in a first diagonal direction of the pixel array 1005. For example, the first diagonal direction may refer to a straight direction by which a first crossing point where the first row and the first column of the pixel array 1005 cross each other is connected to a second crossing point where the last row and the last column of the pixel array 1005 cross each other.

The second direct pixel group 1030 may include a plurality of direct pixels 1010 arranged in a line in a second diagonal direction of the pixel array 1005. For example, the second diagonal direction may refer to a straight direction by which a first crossing point where the first row and the last column of the pixel array 1005 cross each other is connected to a second crossing point where the last row and the first column of the pixel array 1005 cross each other.

A central pixel disposed at a crossing point of the first direct pixel group 1020 and the second direct pixel group 1030 may be included in each of the first direct pixel group 1020 and the second direct pixel group 1030.

The direct pixels 1010 may be arranged in a line sensor shape within the pixel array 1005, such that the entire region including the direct pixels 1010 arranged in the line sensor shape may be smaller in size than the region including the indirect pixels 1040. This is because the direct pixels 1010 are designed to have a relatively longer effective measurement distance and a relatively higher temporal resolution rather than a purpose of acquiring an accurate depth image. As a result, the direct pixels 1010 can recognize the presence or absence of the target object 1 in the object monitoring mode using the relatively longer effective measurement distance and the relatively higher temporal resolution, and at the same time can correctly measure the distance to the target object 1 using the relatively longer effective measurement distance and the relatively higher temporal resolution.

Meanwhile, when viewed from depth images respectively generated by the indirect pixels 1040, each of the direct pixels 1010 may act as a dead pixel. In this case, the image signal processor 200 may perform interpolation of the depth images respectively corresponding to positions of the direct pixels 1010, by means of digital data of the indirect pixels 1040 that are located adjacent to the direct pixels 1010 within the range of a predetermined distance (e.g., two pixels) or less.

In the rectangular pixel array 1005, the plurality of indirect pixels 1040 may be arranged in a matrix shape within the remaining regions other than the region provided with the plurality of direct pixels 1010.

The row driver 1050 and the modulation driver 1060 may correspond to the indirect pixel driver 130 shown in FIG. 1. The row driver 1050 may be arranged in a vertical direction (or a column direction) of the pixel array 1005, and the modulation driver 1060 may be arranged in a horizontal direction (or a row direction) of the pixel array 1005. The row driver 1050 may provide the reset control signals RG1~RG4 and the selection control signals SEL1~SEL4 to each of the indirect pixels 1040. The reset control signals RG1~RG4 and the selection control signals SEL1~SEL4 may be supplied through a signal line extending in a horizontal direction, such that the plurality of indirect pixels 1040 belonging to the same row of the pixel array 1005 may receive the same reset control signals RG1~RG4 and the same selection control signals SEL1~SEL4.

The modulation driver 1060 may provide the circulation control signals CXV1~CXV4 and the transfer control signals TFv1~TFv4 to each of the indirect pixels 1040. The circulation control signals CXV1~CXV4 and the transfer control signals TFv1~TFv4 may be supplied through a signal line extending in a vertical direction, such that the plurality of indirect pixels 1040 belonging to the same column of the pixel array 1005 may receive the same circulation control signals CXV1~CXV4 and the same transfer control signals TFv1~TFv4.

Although not shown in FIG. 10, if at least one of the quenching circuit (QC) and the recharging circuit (RC) in each of the direct pixels 1010 is implemented as an active device, the direct pixel driver for supplying the quenching control signal (QCS) and/or the recharging control signal may be further disposed. A method for supplying signals by the direct pixel driver may correspond to that of the row driver 1050.

The horizontal TDC 1070 and the vertical TDC 1080 may correspond to the direct readout circuit 140 shown in FIG. 1. The horizontal TDC 1070 may be arranged in a horizontal direction (or a row direction) at an upper side (or a lower side) of the pixel array 1005. The vertical TDC 1080 may be arranged in a vertical direction (or a column direction) at a right side (or a left side) of the pixel array 1005.

The horizontal TDC 1070 may be coupled to each direct pixel 1010 included in the first direct pixel group 1020. The horizontal TDC 1070 may include a plurality of TDCs (i.e., TDC circuits) that correspond to the direct pixels 1010 of the first direct pixel group 1020 on a one to one basis.

The vertical TDC 1080 may be coupled to each direct pixel 1010 included in the second direct pixel group 1030. The vertical TDC 1080 may include a plurality of TDCs (i.e., TDC circuits) that correspond to the direct pixels 1010 of the second pixel group 1030 on a one to one basis.

Each TDC included in either the horizontal TDC 1070 or the vertical TDC 1080 may include a digital logic circuit configured to generate digital data by calculating a time delay between a pulse signal of the corresponding direct pixel DPX and a reference pulse, and an output buffer configured to store the generated digital data therein. The point of each direct pixel 1010 shown in FIG. 10 may refer to a terminal for electrical connection to either the horizontal TDC 1070 or the vertical TDC 1080. The central pixel may include two points, such that the two points may be respectively coupled to the horizontal TDC 1070 and the vertical TDC 1080.

In the image sensing device 1000 based on some implementations of the disclosed technology, each TDC circuit may not be disposed in the direct pixel 1010, and may be disposed at one side of the pixel array 1005 without being disposed in the pixel array 1005, such that the region of each direct pixel 1010 can be greatly reduced in size. Accordingly, the direct pixels 1010 and the indirect pixels 1040 may be simultaneously disposed in the pixel array 1005, and many more direct pixels 1010 can be disposed in the pixel array 1005, such that higher resolution may be obtained when the distance to the target object is sensed by the direct TOF method.

The indirect readout circuit 1090 may correspond to the indirect readout circuit 150 shown in FIG. 1, may process analog pixel signals generated from the indirect pixels 1040, may generate and store digital data corresponding to the processed pixel signals. The indirect pixels 1040 belonging to the same column of the pixel array 1005 may output pixel signals through the same signal line. Therefore, in order to normally transfer such pixel signals, the indirect pixels 1040 may sequentially output the pixel signals on a row basis.

Figure 11:
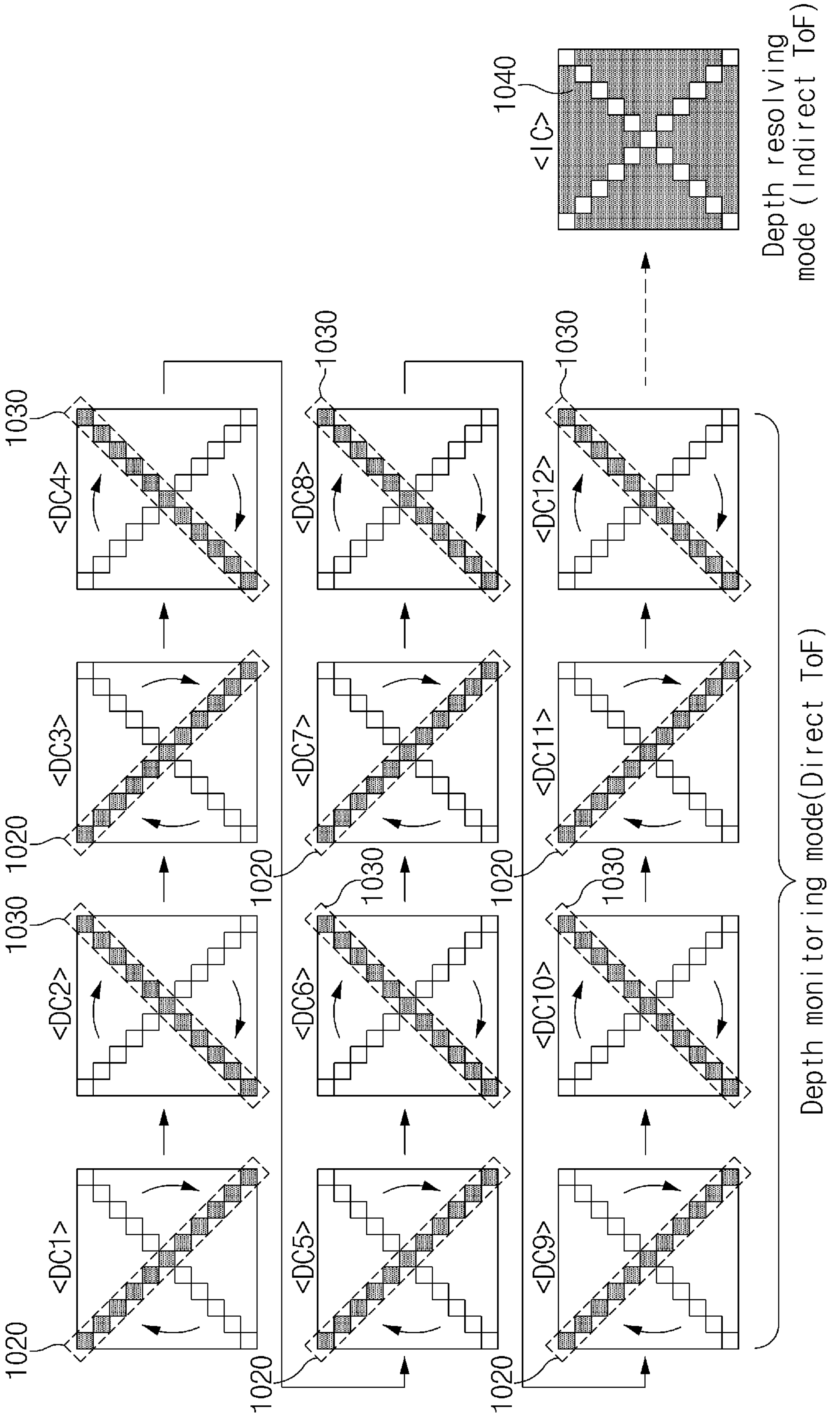
FIG. 11 is a conceptual diagram illustrating an example of operations of the image sensing device shown in FIG. 10 based on some implementations of the disclosed technology.

FIG. 11 is a conceptual diagram illustrating an example of operations of the image sensing device 1000 shown in FIG. 10 based on some implementations of the disclosed technology.

Referring to FIGS. 10 and 11, when the image sensing device 1000 operates in each of the object monitoring mode and the depth resolving mode, information about how pixels are activated according to lapse of time are illustrated. In this case, activation of such pixels may refer to an operation state in which each pixel receives a control signal from the corresponding pixel driver 120 or 130, generates a signal (e.g., a pulse signal or a pixel signal) formed by detection of incident light, and transmits the generated signal to the corresponding readout circuit 140 or 150. In FIG. 11, the activated pixels may be represented by shaded pixels.

In the object monitoring mode in which the image sensing device 1000 generates digital data indicating the distance to the target object using the direct TOF method, the image sensing device 1000 may operate sequentially in units of a direct cycle (or on a direct-cycle basis). As can be seen from FIG. 11, the image sensing device 1000 may sequentially operate in the order of first to twelfth direct cycles DC1~DC12. Each of the first to twelfth direct cycles DC1~DC12 may refer to a time period in which a series of operations including, for example, an operation of emitting pulse light to the target object 1, an operation of generating a pulse signal corresponding to reflected light received from the target object 1, an operation of generating digital data corresponding to the pulse signal, a quenching operation, and a recharging operation, can be performed. For example, the time period t1~t2 or t2~t3 shown in FIG. 9 may correspond to a single direct cycle.

In the first direct cycle DC1, the direct pixels 1010 included in the first direct pixel group 1020 may be activated, and the direct pixels 1010 included in the second direct pixel group 1030 may be deactivated. The horizontal TDC 1070 for processing the pulse signal of the first direct pixel group 1020 may be activated, and the vertical TDC 1080 for processing the pulse signal of the second direct pixel group 1030 may be deactivated. In addition, the indirect pixels 1040, and the constituent elements 1050, 1060, and 1090 for controlling and reading out the indirect pixels 1040 may be deactivated.

In the second direct cycle DC2, the direct pixels 1010 included in the first direct pixel group 1020 may be deactivated, and the direct pixels 1010 included in the second direct pixel group 1030 may be activated. In addition, the horizontal TDC 1070 for processing the pulse signal of the first direct pixel group 1020 may be deactivated, and the vertical TDC 1080 for processing the pulse signal of the second direct pixel group 1030 may be activated. In addition, the indirect pixels 1040, and the constituent elements 1050, 1060, and 1090 for controlling and reading out the indirect pixels 1040 may be deactivated.

Not only in the third to twelfth direct cycles DC3~DC12, but also in subsequent direct cycles, the direct pixels 1010 included in the first direct pixel group 1020 and the direct pixels included in the second direct pixel group 1030 may be alternately activated in the same manner as in the first direct cycle DC1 and the second direct cycle DC2. Therefore, the horizontal TDC 1070 and the vertical TDC 1080 may also be activated alternately with each other.

Therefore, a minimum number of the direct pixels having relatively large power consumption may be included in the pixel array 1005, and only some of the direct pixels may be activated within one direct cycle, such that power consumption can be optimized.

In addition, pixels to be activated in the pixel array 1005 may be changed from pixels of the first direct pixel group 1020 to pixels of the second direct pixel group 1030 or may be changed from pixels of the second direct pixel group 1030 to pixels of the first direct pixel group 1020, such that effects similar to those of a light beam of a radar system configured to rotate by 360° can be obtained.

Although the above-mentioned embodiment of the disclosed technology has disclosed that the first direct pixel group 1020 is first activated for convenience of description, the scope or spirit of the disclosed technology is not limited thereto, and the second direct pixel group 1030 according to another embodiment can be activated first as necessary. In addition, although the above-mentioned embodiment of the disclosed technology has disclosed that the entire direct cycle can extend to at least the twelfth direct cycle DC12 for convenience of description, the scope or spirit of the disclosed technology is not limited thereto. If the predetermined condition described in step S30 shown in FIG. 3 is satisfied in any other steps prior to reaching the twelfth direct cycle DC12, the operation mode of the image sensing device 1000 may switch from the object monitoring mode to the depth resolving mode.

If the operation mode of the image sensing device 1000 switches from the object monitoring mode to the depth resolving mode, the indirect cycle (IC) may be started. In the indirect cycle (IC), the indirect pixels 1040 and the constituent elements 1050, 1060, and 1090 for controlling and reading out the indirect pixels 1040 may be activated. In the indirect cycle (IC), the indirect pixels 1040 can be activated at the same time. In addition, the direct pixels 1010 and the constituent elements 1070 and 1080 for controlling and reading out the direct pixels 1010 may be deactivated.

Figure 12:
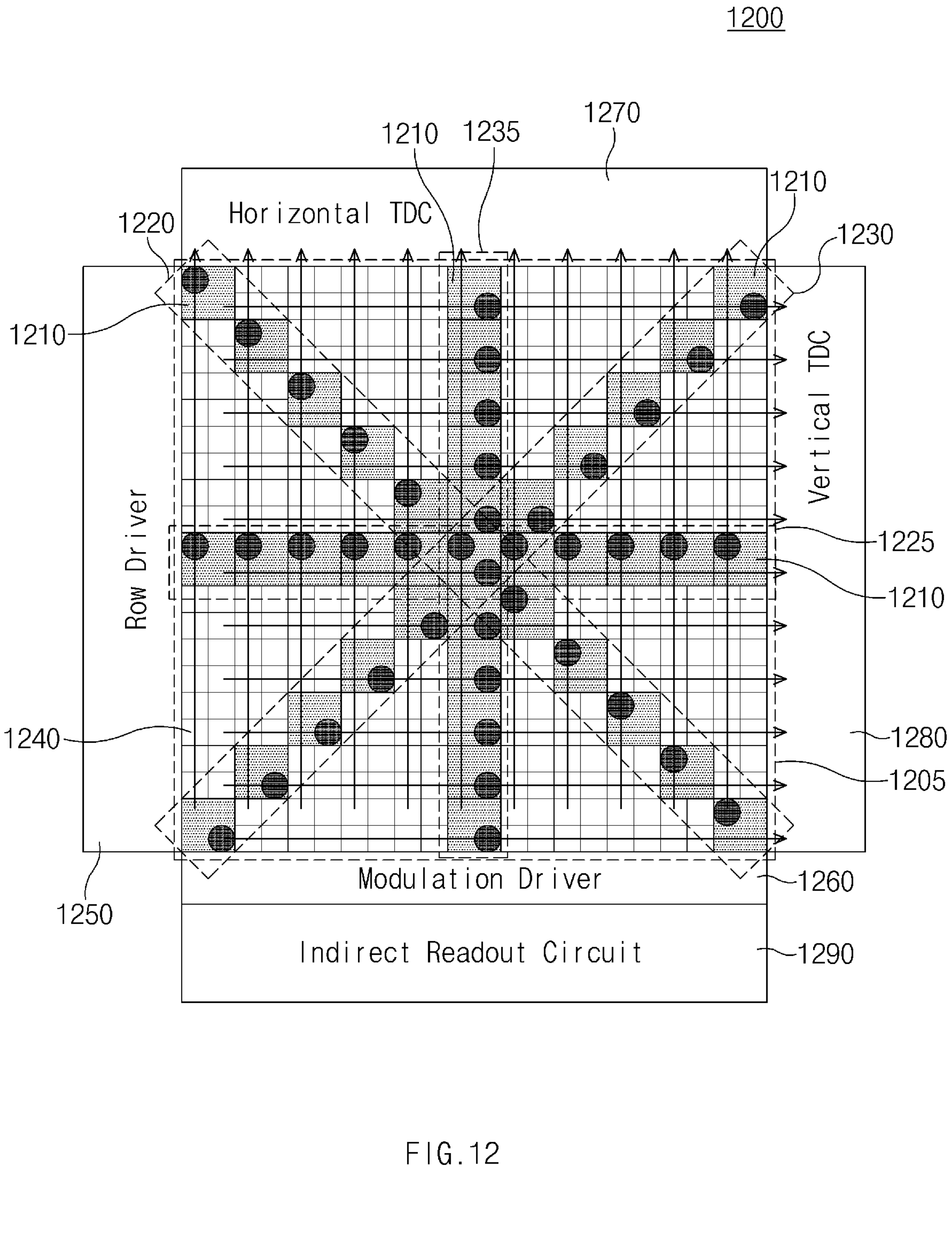
FIG. 12 is a conceptual diagram illustrating another example of operations of the image sensing device shown in FIG. 1 based on some implementations of the disclosed technology.

FIG. 12 is a conceptual diagram illustrating another example of operations of the image sensing device 100 shown in FIG. 1 based on some implementations of the disclosed technology.

The image sensing device 1200 shown in FIG. 12 may illustrate another example of some constituent elements included in the image sensing device 100 shown in FIG. 1. The image sensing device 1200 may include a pixel array 1205, a row driver 1250, a modulation driver 1260, a horizontal TDC 1270, a vertical TDC 1280, and an indirect readout circuit 1290. The remaining components of the image sensing device 1200 other than some structures different from those of the image sensing device 1000 may be substantially similar in structure and function to those of the image sensing device 1000 shown in FIG. 10, and as such redundant description thereof will herein be omitted for brevity. For convenience of description, the image sensing device 1200 shown in FIG. 12 will hereinafter be described centering upon characteristics different from those of the image sensing device 1000 shown in FIG. 10.

The pixel array 1205 may further include a third direct pixel group 1225 and a fourth direct pixel group 1235, each of which includes a plurality of direct pixels 1210. The entire region and detailed operations of the direct pixels 1210 included in each of the third and fourth direct pixel groups 1225 and 1235 may be substantially identical to those of the direct pixels 1210.

The third direct pixel group 1225 may include a plurality of direct pixels 1210 arranged in a line in a horizontal direction (or a row direction) of the pixel array 1205.

The fourth direct pixel group 1235 may include a plurality of direct pixels 1210 arranged in a line in a vertical direction (or a column direction) of the pixel array 1205.

The first direct pixel group 1220 and the second direct pixel group 1230 may be defined as a first set. The third direct pixel group 1225 and the fourth direct pixel group 1235 may be defined as a second set.

A central pixel disposed at a crossing point of the first to fourth direct pixels groups 1220, 1225, 1230, and 1235 may be included in each of the first to fourth direct pixel groups 1220, 1225, 1230, and 1235.

On the other hand, the horizontal TDC 1270 may be coupled to each direct pixel 1210 included in the first direct pixel group 1220 and each direct pixel 1210 included in the third direct pixel group 1225. Each direct pixel 1210 of the first direct pixel group 1220 and each direct pixel 1210 of the third direct pixel group 1225, that are arranged in a line in the column direction, may be coupled to the same signal line, and the horizontal TDC 1270 may include a plurality of TDC circuits each corresponding to a set of two direct pixels 1210.

The vertical TDC 1280 may be coupled to each direct pixel 1210 included in the second direct pixel group 1230 and each direct pixel 1210 included in the fourth direct pixel group 1235. Each direct pixel 1210 of the second direct pixel group 1230 and each direct pixel 1210 of the fourth direct pixel group 1235, that are arranged in a line in the column direction, may be coupled to the same signal line, and the vertical TDC 1280 may include a plurality of TDC circuits each corresponding to a set of two direct pixels 1210.

Figure 13:
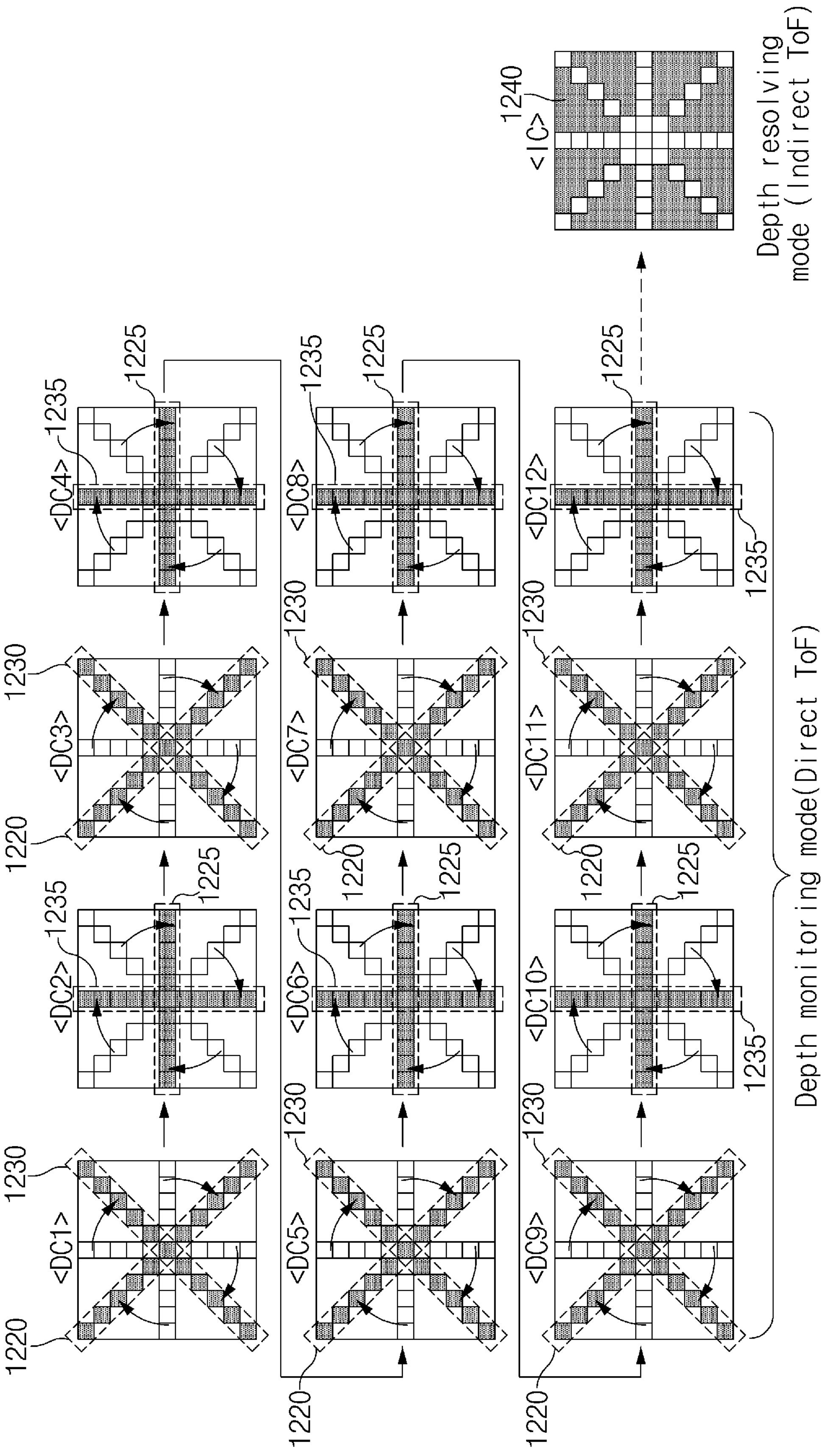
FIG. 13 is a conceptual diagram illustrating an example of operations of the image sensing device shown in FIG. 12 based on some implementations of the disclosed technology.

FIG. 13 is a conceptual diagram illustrating an example of operations of the image sensing device shown in FIG. 12 based on some implementations of the disclosed technology.

Referring to FIGS. 12 and 13, when the image sensing device 1200 operates in each of the object monitoring mode and the depth resolving mode, information about how pixels are activated according to lapse of time are illustrated. In this case, activation of such pixels may refer to an operation state in which each pixel receives a control signal from the corresponding pixel driver 120 or 130, generates a signal (e.g., a pulse signal or a pixel signal) acquired by detection of incident light, and transmits the generated signal to the corresponding readout circuit 140 or 150. In FIG. 13, the activated pixels may be represented by shaded pixels.

In the object monitoring mode in which the image sensing device 1200 generates digital data indicating the distance to the target object using the direct TOF method, the image sensing device 1200 may operate sequentially in units of a direct cycle (or on a direct-cycle basis). As can be seen from FIG. 13, the image sensing device 1200 may sequentially operate in the order of first to twelfth direct cycles DC1~DC12. Each of the first to twelfth direct cycles DC1~DC12 may refer to a time period in which a series of operations including, for example, an operation of emitting pulse light to the target object 1, an operation of generating a pulse signal corresponding to reflected light received from the target object 1, an operation of generating digital data corresponding to the pulse signal, the quenching operation, and the recharging operation, can be performed. For example, the time period t1~t2 or t2~t3 shown in FIG. 9 may correspond to a single direct cycle.

In the first direct cycle DC1, the direct pixels 1210 included in each of the first direct pixel group 1220 and the second direct pixel group 1230 that correspond to the first set may be activated, and the direct pixels 1210 included in each of the third direct pixel group 1225 and the fourth direct pixel group 1235 that correspond to the second set may be deactivated. The horizontal TDC 1270 for processing the pulse signal of the first direct pixel group 1220 and the vertical TDC 1280 for processing the pulse signal of the second direct pixel group 1230 may be activated. In addition, the indirect pixels 1240, and the constituent elements 1250, 1260, and 1290 for controlling and reading out the indirect pixels 1240 may be deactivated.

In the second direct cycle DC2, the direct pixels 1210 included in each of the first direct pixel group 1220 and the second direct pixel group 1230 that correspond to the first set may be deactivated, and the direct pixels 1210 included in each of the third direct pixel group 1225 and the fourth direct pixel group 1235 that correspond to the second set may be activated. The horizontal TDC 1270 for processing the pulse signal of the third direct pixel group 1225 and the vertical TDC 1280 for processing the pulse signal of the fourth direct pixel group 1235 may be activated at the same time. In addition, the indirect pixels 1240, and the constituent elements 1250, 1260, and 1290 for controlling and reading out the indirect pixels 1240 may be deactivated.

Not only in the third to twelfth direct cycles DC3~DC12, but also in subsequent direct cycles, the direct pixels 1210 included in the first and second direct pixel groups 1220 and 1230 and the direct pixels included in the third and fourth direct pixel groups 1225 and 1235 may be alternately activated in the same manner as in the first direct cycle DC1 and the second direct cycle DC2.

Therefore, a minimum number of the direct pixels having relatively larger power consumption may be included in the pixel array 1205, and only some of the direct pixels may be activated within one direct cycle, such that the amount of power consumption can be optimized.

In addition, pixels to be activated in the pixel array 1205 may be changed from the direct pixels 1210 (i.e., the first and second direct pixel groups 1220 and 1230) arranged in the diagonal direction to the direct pixels 1210 (i.e., the third and fourth direct pixel groups 1225 and 1235) arranged in the horizontal and vertical directions, or may be changed from the direct pixels 1210 arranged in the horizontal and vertical directions to the direct pixels 1210 arranged in the diagonal direction, such that effects similar to those of a light beam of a radar system can be obtained.

Although the above-mentioned embodiment of the disclosed technology has disclosed that the first and second direct pixel groups 1220 and 1230 are first activated for convenience of description, the scope or spirit of the disclosed technology is not limited thereto, and the third and fourth direct pixel groups 1225 and 1235 according to another embodiment can be activated first as necessary. Although FIG. 13 has disclosed that two direct pixel groups are simultaneously activated in each direct cycle, it should be noted that only one direct pixel group may be activated in each direct cycle based on some other implementations of the disclosed technology. For example, the first direct pixel group 1220, the fourth direct pixel group 1235, the second direct pixel group 1230, and the third direct pixel group 1225 may be sequentially activated clockwise, such that effects similar to those of a light beam of a radar system can be obtained.

In addition, although the above-mentioned embodiment of the disclosed technology has disclosed that the entire direct cycle can extend to at least the twelfth direct cycle DC12 for convenience of description, the scope or spirit of the disclosed technology is not limited thereto, and other implementations are also possible. For example, if the predetermined condition described in step S30 shown in FIG. 3 is satisfied in any other steps prior to reaching the twelfth direct cycle DC12, the operation mode of the image sensing device 1200 may switch from the object monitoring mode to the depth resolving mode.

If the operation mode of the images sensing device 1200 switches from the object monitoring mode to the depth resolving mode, the indirect cycle (IC) may be started. In the indirect cycle (IC), the indirect pixels 1240 and the constituent elements 1250, 1260, and 1290 for controlling and reading out the indirect pixels 1240 may be activated. In addition, the direct pixels 1210 and the constituent elements 1270 and 1280 for controlling and reading out the direct pixels 1210 may be deactivated.

As is apparent from the above description, the image sensing device based on some implementations of the disclosed technology can be equipped with different sensing pixels and associated circuitry for performing TOF measurements based on different TOF measurement techniques with different TOF sensing capabilities so that the device can select an optimum TOF method in response to a distance to a target object, such that the image sensing device can sense the distance to the target object using the optimum TOF method.

The embodiments of the disclosed technology may be implemented in various ways to achieve one or more advantages or desired effects.

Although a number of illustrative embodiments have been described, it should be understood that numerous modifications or enhancements to the disclosed embodiments and other embodiments can be devised based on what is described and/or illustrated in this patent document.

What is claimed is:

1. An image sensing device, comprising:

a pixel array configured to include at least one first pixel and at least one second pixel; and a timing controller configured to activate either a first pixel or a second pixel based on a distance between a target object and the pixel array, wherein:

the first pixel corresponds to a direct pixel configured to sense the distance to the target object based on a directly measured round trip time from a first time where pulse light is emitted to the target object to a second time where the pulse light reflected from the target object is incident to the first pixel; and the second pixel corresponds to an indirect pixel configured to sense the distance to the target object based on a phase difference between a clock signal controlling a modulated light emitted to the target object and a pixel signal generated by the second pixel detecting the modulated light reflected from the target object, wherein the timing controller is configured to activate the first pixel in response to the distance between the target object and the pixel array being longer than a threshold distance, and activate the second pixel in response to the distance between the target object and the pixel array being equal to or shorter than the threshold distance, wherein the image sensing device further comprises:

a horizontal time-to-digital circuit (TDC) disposed at one side of the pixel array, and configured to process an output signal of a first direct pixel group; and a vertical time-to-digital circuit (TDC) disposed at the other side of the pixel array, and configured to process an output signal of a second direct pixel group.

2. The image sensing device according to claim 1, wherein the first pixel corresponds to a single-photon avalanche diode (SPAD) pixel.

3. The image sensing device according to claim 1, wherein the first pixel includes:

a single-photon avalanche diode (SPAD) configured to generate a current pulse by sensing a single photon reflected from the target object;

a quenching circuit configured to control a reverse bias voltage applied to the single-photon avalanche diode (SPAD); and a digital buffer configured to convert the current pulse into a digital pulse signal.

4. The image sensing device according to claim 1, wherein the first pixel and the second pixel have different characteristics that include at least one of an effective measurement distance related to an ability to effectively sense a distance, a temporal resolution related to an ability to discern a temporal difference, a spatial resolution related to an ability to discern a spatial difference, or unit power consumption indicating an amount of power required to generate a pixel signal.

5. The image sensing device according to claim 1, wherein the first pixel and the second pixel are disposed in contact with each other.

6. The image sensing device according to claim 1, wherein:

in a first direct cycle in which the first pixel is activated, any one of a first direct pixel group and a second direct pixel group is activated; and in a second direct cycle subsequent to the first direct cycle, the other one of the first direct pixel group and the second direct pixel group is activated.

7. The image sensing device according to claim 1, wherein the pixel array further comprises:

a third direct pixel group in which a plurality of first pixels is arranged in a line in a horizontal direction; and a fourth direct pixel group in which a plurality of first pixels is arranged in a line in a vertical direction.

8. The image sensing device according to claim 7, wherein:

the horizontal time-to-digital circuit (TDC) is configured to further process an output signal of the third direct pixel group; and the vertical time-to-digital circuit (TDC) is configured to further process an output signal of the fourth direct pixel group.

9. The image sensing device according to claim 7, wherein:

in a first direct cycle in which the first pixel is activated, any one of a first set including a first direct pixel group and a second direct pixel group and a second set including the third direct pixel group and the fourth direct pixel group is activated; and in a second direct cycle subsequent to the first direct cycle, the other one of the first set and the second set is activated.

10. The image sensing device according to claim 1, wherein the second pixel includes:

a photoelectric conversion element configured to generate and accumulate photocharges by performing photoelectric conversion of incident light reflected from the target object;

a plurality of circulation gates disposed in regions corresponding to four sides of a rectangular ring shape surrounding the photoelectric conversion element, and configured to induce movement of the photocharges by partially generating an electric field in different regions of the photoelectric conversion element based on circulation control voltages; and a plurality of transfer gates disposed in regions corresponding to vertex points of the rectangular ring shape, and configured to transmit the photocharges to a corresponding floating diffusion (FD) region based on transfer control signals.

11. The image sensing device according to claim 1, wherein the pixel array includes one or more additional first pixels and one or more additional second pixels and a total size of a region for the first pixel and the one or more additional first pixels is smaller than a total size of a region for the second pixel and the one or more additional second pixels.

12. The image sensing device according to claim 1, wherein:

the first pixel is larger in size than the second pixel.

13. The image sensing device according to claim 1, wherein:

the pixel array includes one or more additional first pixels and one or more additional second pixels and the second pixel and the one or more additional second pixels are arranged in a matrix shape.

14. The image sensing device according to claim 13, wherein the second pixel and the one or more additional second pixels are activated at a same time.

15. A photographing device, comprising:

an image sensing device configured to have a first pixel and a second pixel different from the first pixel; and an image signal processor configured to operate the image sensing device in an object monitoring mode in which the first pixel is activated or a depth resolving mode in which the second pixel is activated based on a comparison between a predetermined threshold distance and a distance between the image sensing device and a target object, wherein:

the first pixel is configured to measure a distance to the target object using a direct ToF (time of flight) method and the second pixel is configured to measure the distance to the target object using an indirect ToF method;

the direct ToF method directly measures a round trip time from a first time where pulse light is emitted to the target object to a second time where the pulse light reflected from the target object is incident to the first pixel, and calculates the distance to the target object by using the round trip time and a speed of the pulse light;

the indirect ToF method emits light modulated by a predetermined frequency to the target object, senses modulated light that is reflected from the target object, calculates a phase difference between a clock signal controlling the modulated light and a pixel signal generated by the second pixel detecting the modulated light reflected from the target object, and calculates the distance to the target object based on the phase difference between the clock signal and the pixel signal;

the first pixel is activated in response to the distance between the target object and the image sensing device being longer than the predetermined threshold distance, and the second pixel is activated in response to the distance between the target object and the image sensing device being equal to or shorter than the predetermined threshold distance, wherein the image sensing device further comprises:

a third direct pixel group in which a plurality of first pixels is arranged in a line in a horizontal direction; and a fourth direct pixel group in which a plurality of first pixels is arranged in a line in a vertical direction, and wherein:

in a first direct cycle in which the first pixel is activated, any one of a first set including a first direct pixel group and a second direct pixel group and a second set including the third direct pixel group and the fourth direct pixel group is activated; and in a second direct cycle subsequent to the first direct cycle, the other one of the first set and the second set is activate.

16. The photographing device according to claim 15, wherein the image signal processor is further configured to increase a counted resultant value by a predetermined value based on the comparison; and switch an operation mode of the image sensing device from the object monitoring mode to the depth resolving mode based on the increased counted resultant value.

17. The photographing device according to claim 15, wherein the first pixel and the second pixel are disposed in contact with each other.

18. A sensing device, capable of detecting a distance to an object and comprising:

one or more first sensing pixels configured to detect light and measure a distance to a target object based on a first distance measuring technique;

a first pixel driver coupled to and operable to control the one or more first sensing pixels in detecting light for measuring the distance;

one or more second sensing pixels configured to detect light and measure a distance to a target object based on a second distance measuring technique that is different from the first distance measuring technique so that the first and second distance measuring techniques have different distance measuring characteristics;

a second pixel driver coupled to and operable to control the one or more second sensing pixels in detecting light for measuring the distance; and a controller configured to activate either the one or more first sensing pixels or the one or more second sensing pixels based on the different distance measuring characteristics of the first and second sensing pixels with respect to a distance between the target object and the sensing device, wherein each of the one or more first sensing pixels corresponds to a direct pixel configured to sense the distance to the target object based on a directly measured round trip time from a first time where pulse light is emitted to the target object to a second time where the pulse light reflected from the target object is incident to the direct pixel, wherein each of the one or more second sensing pixels corresponds to an indirect pixel configured to sense the distance to the target object based on a phase difference between a clock signal controlling a modulated light emitted to the target object and a pixel signal generated by the indirect pixel detecting the modulated light reflected from the target object, wherein the controller is configured to activate the one or more first sensing pixels in response to the distance between the target object and the sensing device being longer than a threshold distance, and activate the one or more second sensing pixels in response to the distance between the target object and the sensing device being equal to or shorter than the threshold distance, and wherein the one or more second sensing pixels includes:

a photoelectric conversion element configured to generate and accumulate photocharges by performing photoelectric conversion of incident light reflected from the target object;

a plurality of circulation gates disposed in regions corresponding to four sides of a rectangular ring shape surrounding the photoelectric conversion element, and configured to induce movement of the photocharges by partially generating an electric field in different regions of the photoelectric conversion element based on circulation control voltages; and a plurality of transfer gates disposed in regions corresponding to vertex points of the rectangular ring shape, and configured to transmit the photocharges to a corresponding floating diffusion (FD) region based on transfer control signals.

19. The sensing device as in claim 18, wherein the different distance measuring characteristics of the first and second sensing pixels include, a range of distance that can be measured, a spatial resolution in distance measurements, a time needed for a sensing pixel in performing a distance measurement, or power consumed by a sensing pixel in performing a distance measurement.

* * * * *